(12) United States Patent
Hall et al.

(10) Patent No.: US 8,328,172 B2
(45) Date of Patent: Dec. 11, 2012

(54) CNC MATERIAL PROCESSING SYSTEM WITH WORKPIECE TRAVEL

(75) Inventors: Warren G. Hall, Durham, NC (US); Gordon A. Bergfors, Wake Forest, NC (US); Dirk Hazeleger, Alpharetta, GA (US); Ryan L. Patterson, Mebane, NC (US); William L. Young, Willis Wharf, VA (US)

(73) Assignee: Shopbot Tools, Inc., Durham, NC (US)

( * ) Notice: Subject to any disclaimer, the term of this patent is extended or adjusted under 35 U.S.C. 154(b) by 307 days.

(21) Appl. No.: 12/668,612

(22) PCT Filed: Jul. 16, 2008

(86) PCT No.: PCT/US2008/070192
§ 371 (c)(1),
(2), (4) Date: Jan. 11, 2010

(87) PCT Pub. No.: WO2009/012317
PCT Pub. Date: Jan. 22, 2009

(65) Prior Publication Data
US 2010/0194013 A1 Aug. 5, 2010

Related U.S. Application Data

(60) Provisional application No. 60/950,024, filed on Jul. 16, 2007.

(51) Int. Cl.
*B23Q 1/64* (2006.01)
(52) U.S. Cl. ........................................ 269/56; 269/289 R
(58) Field of Classification Search ............ 269/56, 269/289 R, 289 MR, 900; 211/151, 1.57, 211/157; 193/35 C, 37; 198/750.1, 780, 198/783
See application file for complete search history.

(56) References Cited

U.S. PATENT DOCUMENTS

| | | | | |
|---|---|---|---|---|
| 2,889,907 | A * | 6/1959 | Sullivan | 211/151 |
| 3,176,828 | A * | 4/1965 | Sullivan | 193/35 C |
| 4,329,928 | A * | 5/1982 | Shaw | 211/1.57 |
| 4,974,165 | A | 11/1990 | Locke et al. | |
| 5,049,723 | A * | 9/1991 | Macdonald | 219/121.83 |

(Continued)

OTHER PUBLICATIONS

Shopbot Tools, Inc., International Patent Application No. PCT/US08/70192; filed Jul. 16, 2008; International Search Report and Written Opinion, dated Oct. 22, 2008.

(Continued)

*Primary Examiner* — Hadi Shakeri
(74) *Attorney, Agent, or Firm* — Matthew W. Witsil; Moore & Van Allen PLLC

(57) ABSTRACT

A CNC system including a travelling drive bar assembly for support of material to be processed. A CNC system including a cutting tool operates on a work piece in at least three axes, with a gantry across the machine that a carriage moves along and a tool that moves vertically on the carriage. A drive bar, oriented perpendicularly to the gantry and to a vertical axis, may travel to support and move the workpiece along its line of orientation. The drive bar may include an elongated structural member, two tracks mounted longitudinally to the elongated member on opposite sides of the elongated member, and a rack, adapted to accept a pinion to urge the drive bar to move, also mounted longitudinally to the elongated member. Guide wheels may receive the tracks to support and align the drive bar. Rollers may further support material that is mounted to the drive bar.

34 Claims, 24 Drawing Sheets

U.S. PATENT DOCUMENTS

| | | | |
|---|---|---|---|
| 6,097,417 | A | 8/2000 | Richardson et al. |
| 6,218,639 | B1 | 4/2001 | Bulle |
| 2002/0007548 | A1 | 1/2002 | Stoewer et al. |
| 2002/0070099 | A1 * | 6/2002 | Neely .................. 198/750.1 |

OTHER PUBLICATIONS

Shopbot Tools, Inc., International Patent Application No. PCT/US08/70192; filed Jul. 16, 2008, International Preliminary Report on Patentability, dated Jan. 28, 2010.

* cited by examiner

US 8,328,172 B2

CNC MATERIAL PROCESSING SYSTEM WITH WORKPIECE TRAVEL

PRIORITY

This application claims the benefit of co-pending U.S. Provisional Application No. 60/950,024, filed Jul. 16, 2007, by the inventors hereof, the entire disclosure of which is incorporated herein by reference.

BACKGROUND ART

The present invention relates to Computer Numerically Controlled (CNC) Systems for material processing, and more particularly to an assembly that provides for movement of a workpiece operated on by a CNC System.

CNC systems may be used for, among other things, cutting, drilling, milling, and machining of workpieces with automated production. CNC movement is controlled by parts or cutting files generated by Computer Aided Design (CAD) software and Computer Aided Manufacturing (CAM) technology. The cutting file directs the machine through a series of steps. The instructions direct the system with respect to where the workpiece is to be cut and in what order the cuts are to be made. The cuts may be straight line or circular. Once the CNC program is written and stored in the controller, manual action is normally limited to setting up the part, starting the CNC controller that executes the program, and carrying out any necessary manual operations such as tool changes.

CNC tools may generally be "three-axis," "four-axis," or "five-axis" machines. A three-axis machine is one that allows the tool to move linearly along mutually orthogonal x-, y-, and z-axes of a fixed coordinate system. The x-axis may be considered to be horizontal and to extend along the longitudinal axis of the system; the y-axis is also horizontal, perpendicular to the x-axis, and across the longitudinal axis of the system; and the z-axis is vertical. A four-axis machine is one that allows the tool to move linearly along mutually orthogonal x-, y-, and z-axes of a fixed coordinate system and also allows rotation of a workpiece about a rotary axis. A five-axis machine usually puts a "wrist-like" fourth and fifth axis on the z arm of a three-axis machine to allow full tangential motion of a cutter in relation to the work surface. Numerical control allows digital accuracy to position the axes of a machine and to control other factors such as the cutting speeds and feeds for a machining pattern. This positioning and control information (the Numerical Control (NC) data) makes up an NC part program or "cutting file" that is created by a programmer. It can be used repeatedly to make multiple parts. After they are created, the cutting files are stored in a memory of the control system of the CNC tool. The CNC tool reads the cutting file in order to machine a part.

Traditional CNC systems include a base, defined by horizontal rails and intermediate members, that supports a horizontal table on which a workpiece is disposed. An intermediate piece that may be cut into by the tool when the tool passes through the workpiece may be used to protect the table rather than cutting into the table. The base and the components it supports are fixed, and it is the tool that moves about all applicable axes. The size of the workpiece is limited by the size of the base, so if large workpieces are desired to be processed, a correspondingly large base is required. In addition, the base size determines the footprint of the system, so the larger the base, the larger the footprint of the system, and the area housing the system has to accommodate that footprint.

Other CNC systems have a reduced footprint and may have a table that moves along the x-axis instead of the tool moving along that axis. Such movement can reduce the length of the base, and accordingly can reduce the footprint of the system. The bases of such systems, however, generally do not extend far enough to provide for processing of materials with significant length, so they are limited to handling relatively short workpieces.

DISCLOSURE OF INVENTION

In accordance with one embodiment of the present invention, an assembly for supporting a support surface, workpiece, or other material in a computer numerically controlled material processing system is provided. The system includes a base assembly, a stationary gantry assembly fixedly mounted to the base assembly and including a horizontal gantry, a carriage assembly mounted to the gantry for travelling along the gantry including a tool for operating on a workpiece, and means for vertical tool travel. The support assembly includes an elongated structural member, adapted to have supported material mounted thereto and having a central longitudinal axis. Two tracks are mounted longitudinally to the elongated member on opposite sides of the elongated member, and a rack, adapted to accept a pinion, is also mounted longitudinally to the elongated member.

In accordance with another embodiment of the present invention, a computer numerically controlled material processing system includes a base assembly and a stationary gantry assembly fixedly mounted to the base assembly and including a substantially horizontal gantry aligned substantially parallel to a y-axis. A carriage assembly is mounted to the gantry for traveling along the gantry, with the carriage assembly including means for vertical tool travel substantially parallel to a vertical z-axis. An elongated travelling component oriented along a line of travel substantially parallel to an x-axis, perpendicular to the y- and z-axes, is provided that includes an elongated member, adapted to support material and having a central longitudinal axis substantially parallel to the x-axis. Two tracks are mounted longitudinally to the elongated member on opposite sides of the elongated member. A rack, adapted to accept a pinion, is also mounted longitudinally to the elongated member. Two pairs of guide wheels and respective shafts are provided, with each pair of guide wheels spaced to allow the travelling member to pass between them in rolling contact with the tracks. The guide wheels are mounted to a structural guide support element integral to the base assembly. The shaft of each guide wheel is substantially perpendicular to the guide support element surface to which each respective guide wheel is mounted. A pinion engages the rack and is driven by a motor to urge the travelling component to move along the line of travel.

In another embodiment according to the present invention, a computer numerically controlled material processing system includes a base assembly, a stationary gantry assembly fixedly mounted to the base assembly and including a substantially horizontal gantry aligned substantially parallel to a y-axis, and a carriage assembly mounted to the gantry for traveling along the gantry. The carriage assembly includes means for vertical tool travel substantially parallel to a vertical z-axis. An elongated travelling component oriented along a line of travel substantially parallel to an x-axis, perpendicular to the y- and z-axes, includes an elongated member, adapted to have supported material mounted to it and having a central longitudinal axis substantially parallel to the x-axis. Means for aligning the travelling component longitudinal axis along the line of travel while allowing movement of the travelling component along the line of travel are provided.

In another embodiment according to the present invention, a method of making a travelling component for processing material with a computer numerically controlled system is provided. The system includes a base assembly, a stationary gantry assembly fixedly mounted to the base assembly and including a horizontal gantry, a carriage assembly mounted to the gantry for traveling along the gantry including a tool for operating on a workpiece, and means for vertical tool travel. The material to be processed is supported by and travels concurrently with the travelling component in a horizontal direction substantially perpendicular to the gantry. The method includes providing an elongated structural member, adapted to have supported material mounted thereto and having a central longitudinal axis. Two tracks are mounted longitudinally to the elongated member on opposite sides of the elongated member. A rack, adapted to accept a pinion, is also mounted longitudinally to the elongated member.

In another embodiment according to the present invention, a method of processing material with a computer numerically controlled system is provided. The system includes a base assembly, a stationary gantry assembly fixedly mounted to the base assembly and including a substantially horizontal gantry aligned substantially parallel to a y-axis, and a carriage assembly for traveling along the gantry. The carriage assembly includes means for vertical tool travel substantially parallel to a vertical z-axis. The method includes moving an elongated travelling component oriented along a line of travel substantially parallel to an x-axis, perpendicular to the y- and z-axes. The travelling component includes an elongated member, adapted to have supported material mounted to it and having a central longitudinal axis substantially parallel to the x-axis. Two tracks are mounted longitudinally to the elongated member on opposite sides of the elongated member. A rack, adapted to accept a pinion, is also mounted longitudinally to the elongated member. The travelling component is aligned with two pairs of guide wheels and respective shafts, with each pair of guide wheels spaced to allow the travelling member to pass between them in rolling contact with the tracks. The travelling component is urged to move along the line of direction by driving a pinion with a motor while the pinion engages the rack.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BEST MODES(S) FOR CARRYING OUT THE INVENTION

Figure 1:
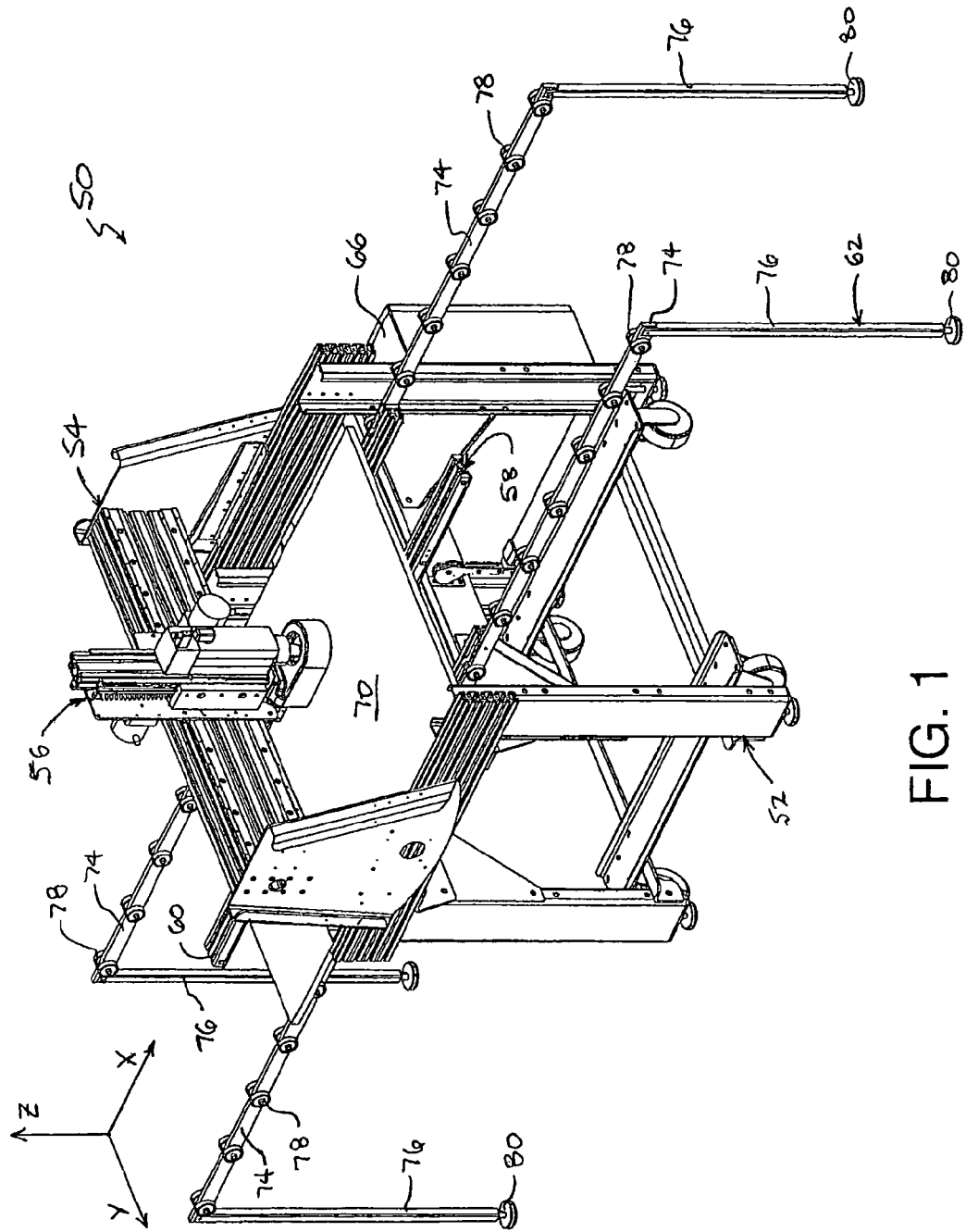
FIG. 1 is a downward perspective view of an embodiment of a CNC system according to the present invention.

In the Figures herein, unique features receive unique reference numerals, while features that are the same in more than one drawing receive the same reference numerals throughout. Where a feature is modified between figures or is modified only by a change in location, a letter may be added or changed after the feature reference numeral to distinguish that feature from a similar feature in a previous figure or the same feature in an alternate location. Further, certain terms of orientation may be used, such as "upper," "lower," "top," "bottom," "left," "right," "inside," "outside," "inner," and "outer." These terms are generally for convenience of reference, and should be so understood unless a particular embodiment requires otherwise.

The scope of the invention is not intended to be limited by materials listed herein, but may be carried out using any materials that allow the construction and operation of the present invention. Materials and dimensions depend on the particular application. In general the materials of the components may be metal, and selectively may be aluminum, steel, hardened steel, titanium, plastic, or rubber. Examples of additional materials that could be selected include: plastics and acrylics such as UHMW (Ultra-High Molecular Weight) Polyethylene, PTFE (polytetrafluoroethylene or TEFLON, a registered trademark of E.I. du Pont de Nemours and Company), HDPE (High Density Polyethylene), polycarbonate resin thermoplastic (such as LEXAN, a registered trademark for SABIC Innovative Plastics'), Poly(methyl methacrylate)

(such as Plexi-glass); urethane and other foams; other non-ferrous metals (i.e., brass, copper, and bronze); composites made up of materials such as carbon fiber, para-aramid synthetic fiber such as Kevlar (KEVLAR is a registered trademark of E.I. du Pont de Nemours and Company), fiberglass and phenolic to name a few; and wood, fiberboard and wood composite materials (i.e., plywood, laminated panels, and chip board).

Referring now to the drawings, an embodiment of a CNC system 50 according to the present invention is shown in FIG. 1. The CNC system 50 may have a base assembly 52, a gantry assembly 54, a YZ carriage assembly 56, a drive bar assembly 58 including a drive bar 60, and an outfeed assembly 62. The gantry assembly 54, the drive bar assembly 58, the outfeed assembly 62, and a control box 66 may be mounted to the base assembly 52. Motor, sensor, input/output, zeroing, and other device cables may be routed to the control box 66 to provide a self-contained and mobile unit, wherein the only external connections may be to a computer and a power source. A work support surface 70 may be mounted to the drive bar assembly 58. Alternatively, a waste board may be mounted to the drive bar, or a workpiece may be directly mounted to the drive bar, but reference is made herein to the mounted element being a metal support surface. Workpieces, not shown, may include, for example, wood, plastics, and soft metals. The support surface 70 may also be supported itself, especially in the case of relatively long support surfaces or workpieces, by the outfeed assembly 62, which may include outfeed bars 74 that may be connected to X rails 64, which may be extrusions with bars attached, and legs 76. Skate wheels 78 may be mounted to the bars 74 for the support surface 70 to ride on, and machine glides 80 may be mounted to the legs 76. The support surface 70 may provide a more rigid work supporting surface than the drive bar 60 alone. The method of holding a workpiece down on the work surface may be as selected by one of ordinary skill in the art, such as clamping, bolting, and vacuum.

As shown in FIGS. 2 and 6-12, the base assembly 52 includes legs 90, lower supports 92 fastened at each end across the machine 50, parallel to the y-axis, to a leg 90, upper supports 94 also fastened at each end across the machine 50 to a leg 90, and side members 96 fastened at each end along the machine 50 parallel to the x-axis to a leg 90 at the upper end of each leg 90. Gussets 98 provide stiffness and stability between the legs and the upper supports. Casters 100 may be attached to caster support members 102 that extend between the lower supports 92, with two fixed casters at one end and two swivel casters at the other end for maneuverability. Machine glides 80 may be provided on the legs 90 to level the system 50 before machining and to provide reduced vibration. Alternatively, rather than a base with legs 90 as shown, a base could be provided that rests on a platform or table top.

The gantry assembly 54 is mounted to the base assembly 52 at the side members 96 with an end plate 104 and gusset 106 at each end of a gantry Y beam 110, and the end plates 104 are mounted to the ends of the Y beam 110. The YZ carriage assembly 56 rides along rails 112 mounted to the Y beam 110 that include "V" guides or tracks, driven by a Y motor 114 with a pinion that engages a rack on the Y beam. A Z motor 116 controls the vertical movement and position of the tooling 118 along the Z beam 120 on the YZ carriage assembly 56. The tooling 118 may be, for example, for routing, cutting, milling, machining, drilling, other type of material processing, liquid distribution, or material manipulation such as pick and place operations. The Z beam 120 also has a rack and pinion system with hardened steel V rails and wheels. A spindle 122 drives the tool, which is within a dust skirt 124 with a vacuum hose 126 connected.

Figure 2:
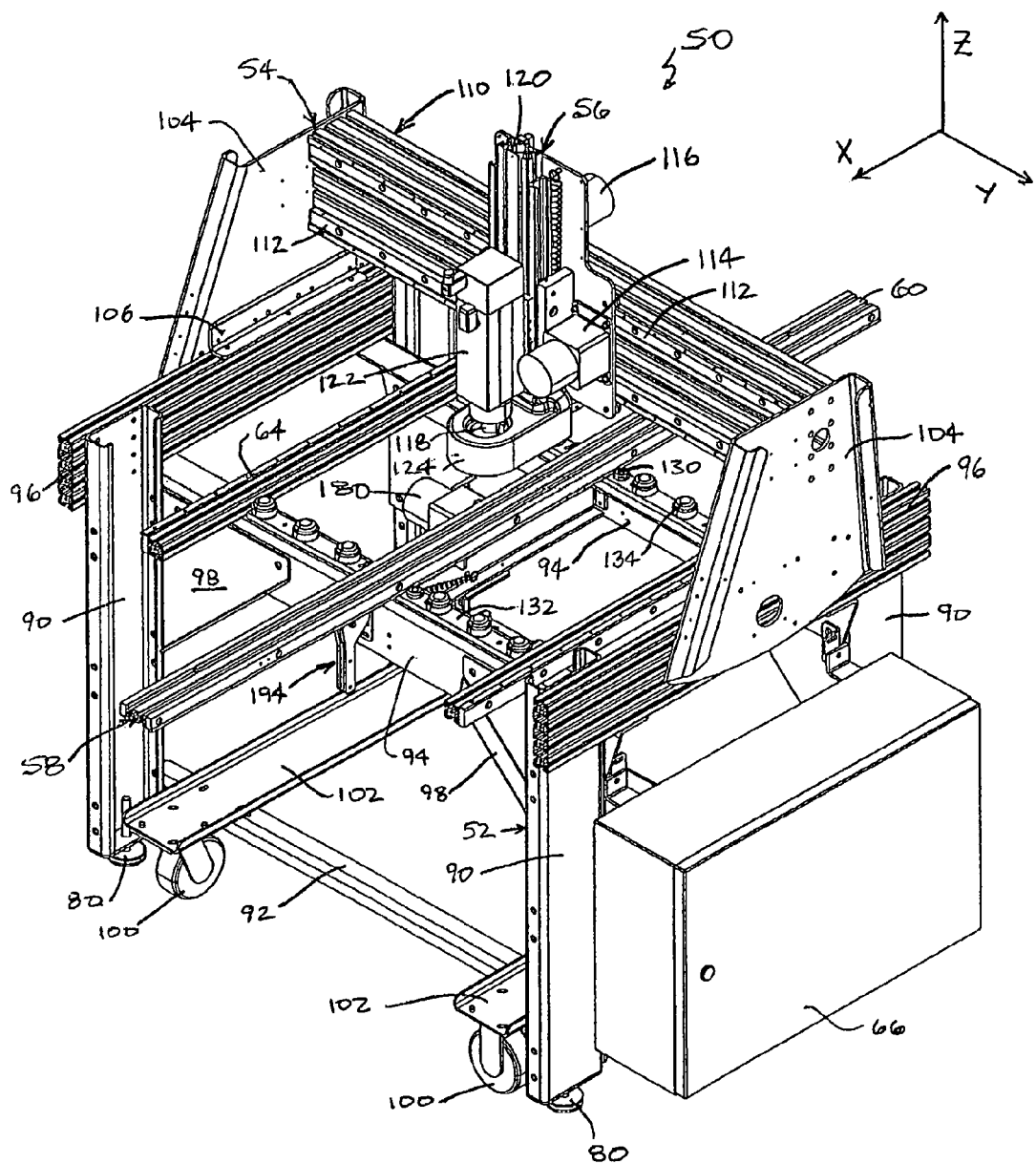
FIG. 2 is a downward perspective view of the CNC system of FIG. 1 with the work support surface removed.
Figure 3:
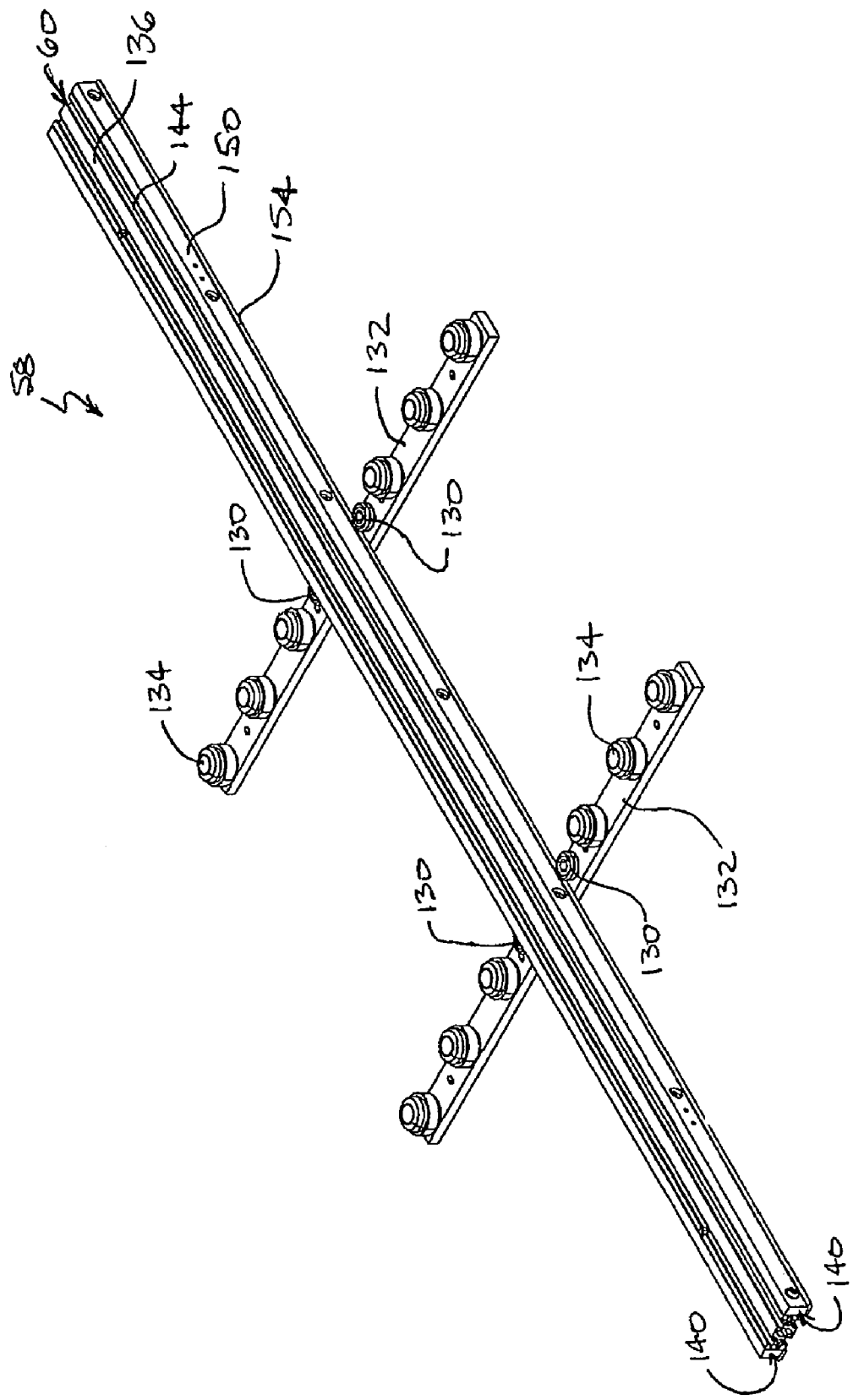
FIG. 3 is a perspective view of a drive bar assembly of the CNC system of FIG. 1.
Figure 4:
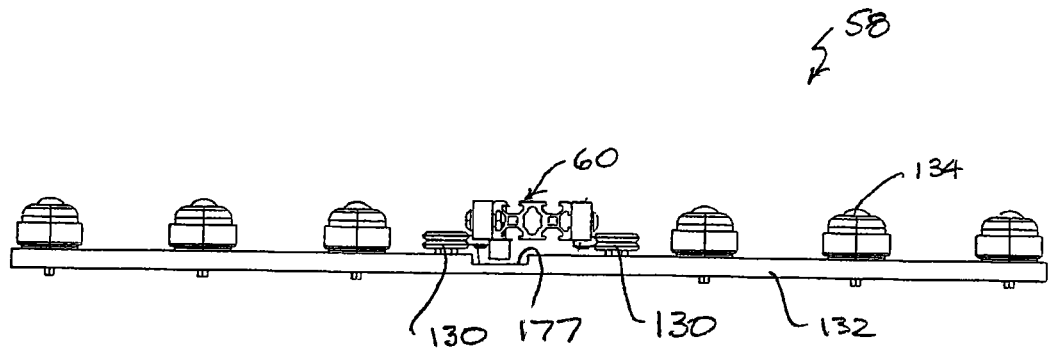
FIG. 4 is front elevation view of the drive bar assembly of the CNC system of FIG. 1.
Figure 5:
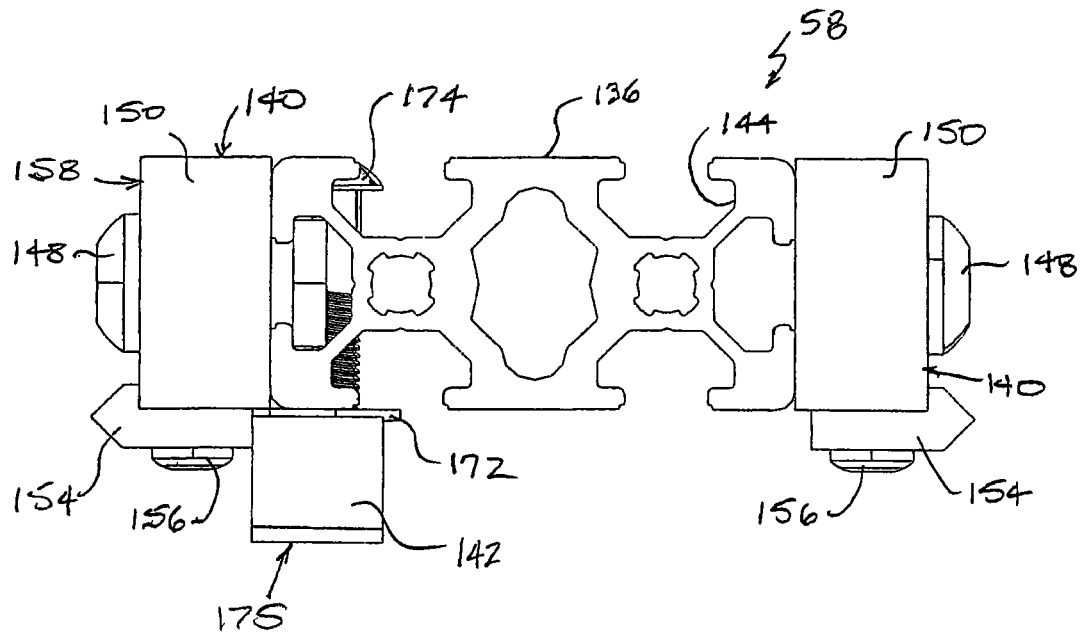
FIG. 5 is a end view of a drive bar of the CNC system of FIG. 1.
Figure 6:
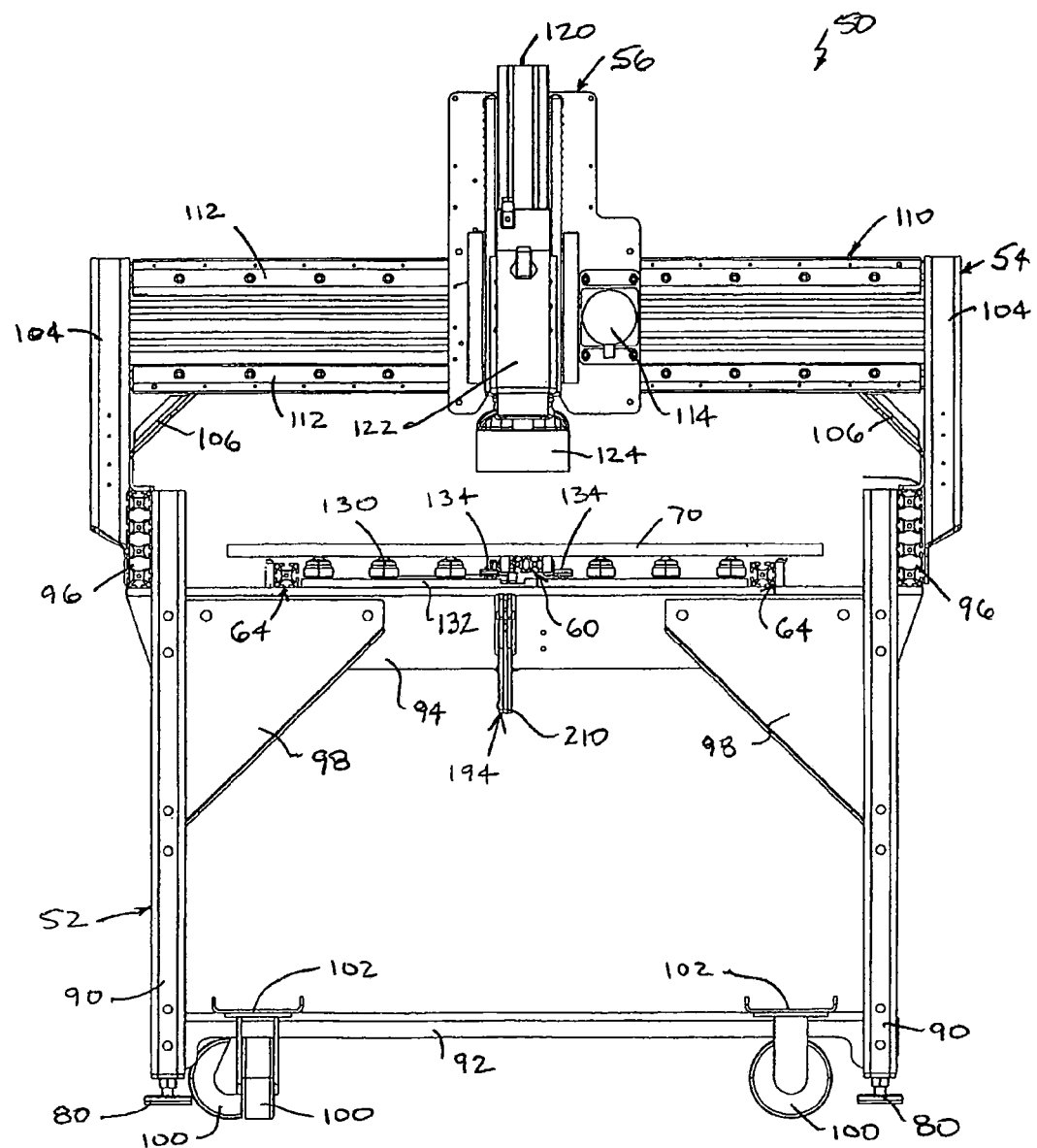
FIG. 6 is front elevation view of the CNC system of FIG. 1.
Figure 7:
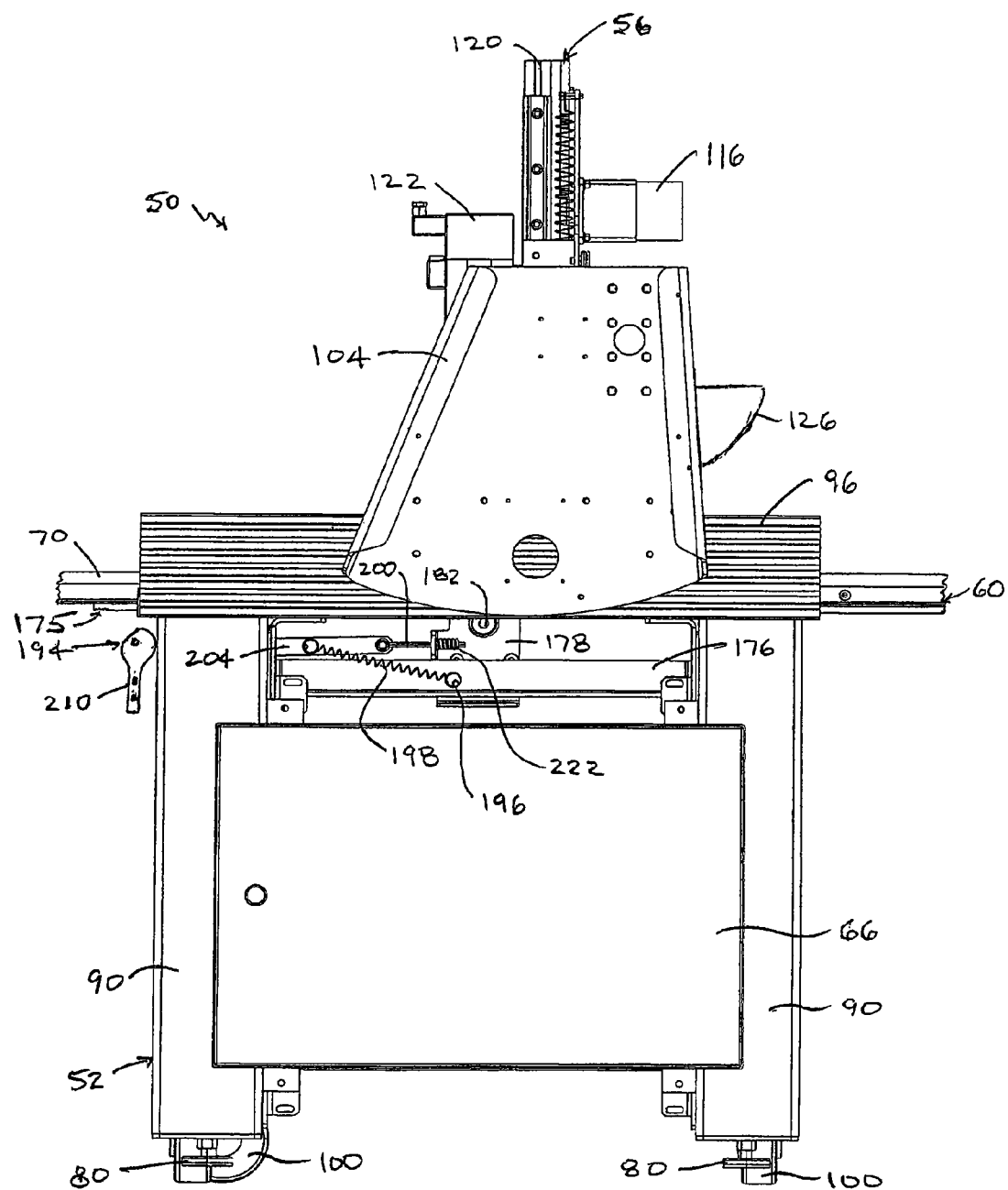
FIG. 7 is a right side elevation view of the CNC system of FIG. 1.
Figure 8:
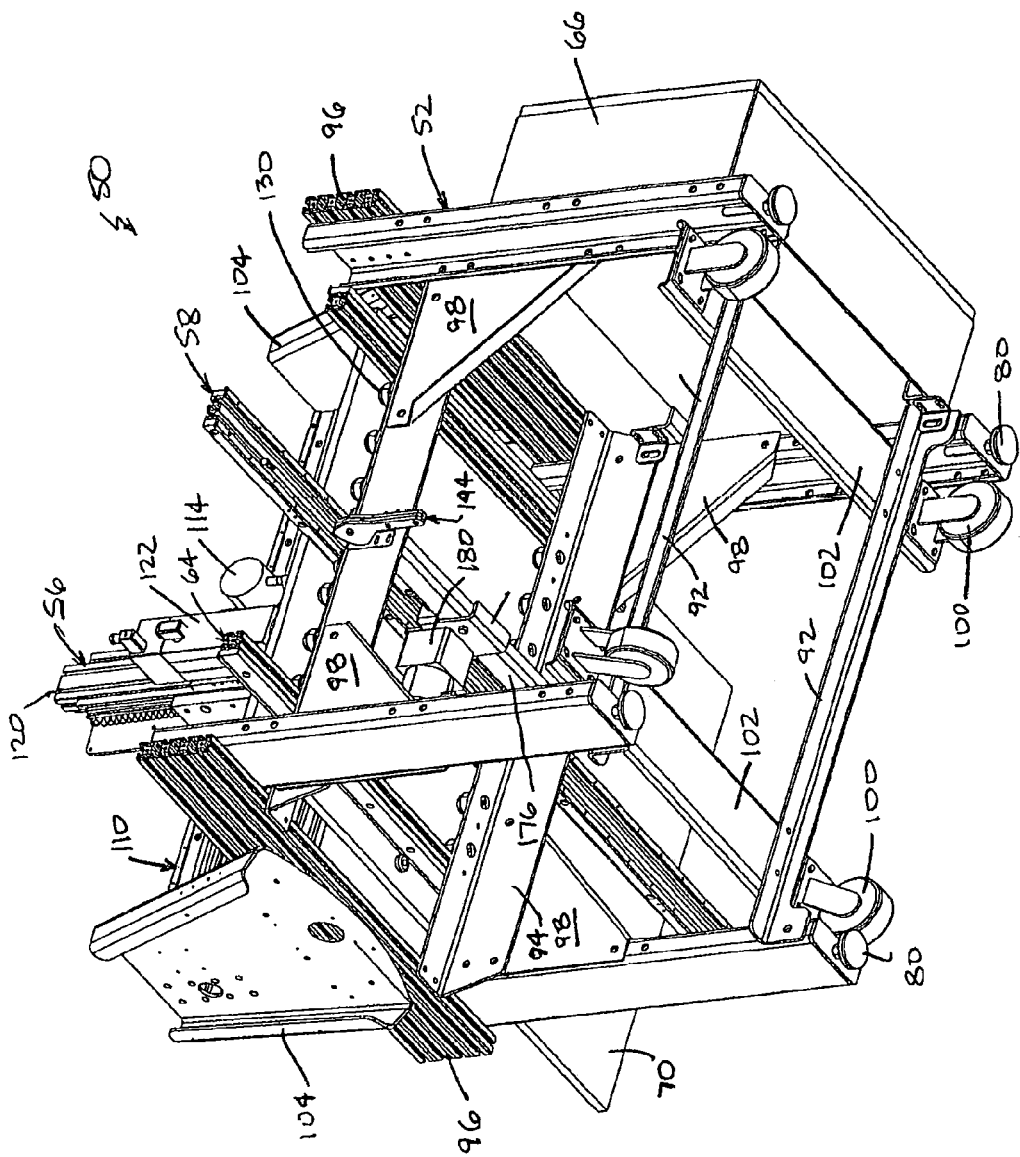
FIG. 8 is an upward perspective view of the CNC system of FIG. 1.
Figure 9:
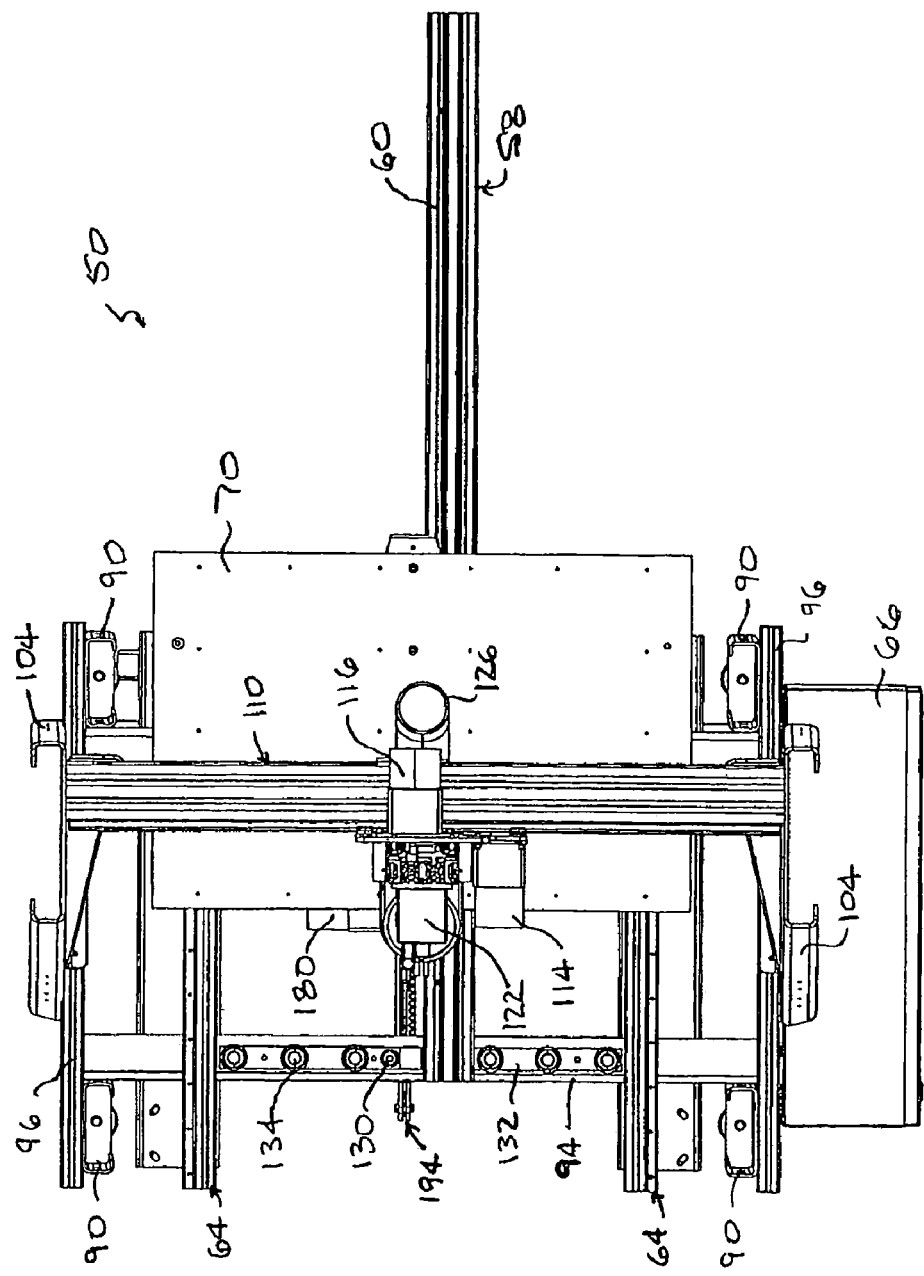
FIG. 9 is a top plan view of the CNC system of FIG. 1.
Figure 10:
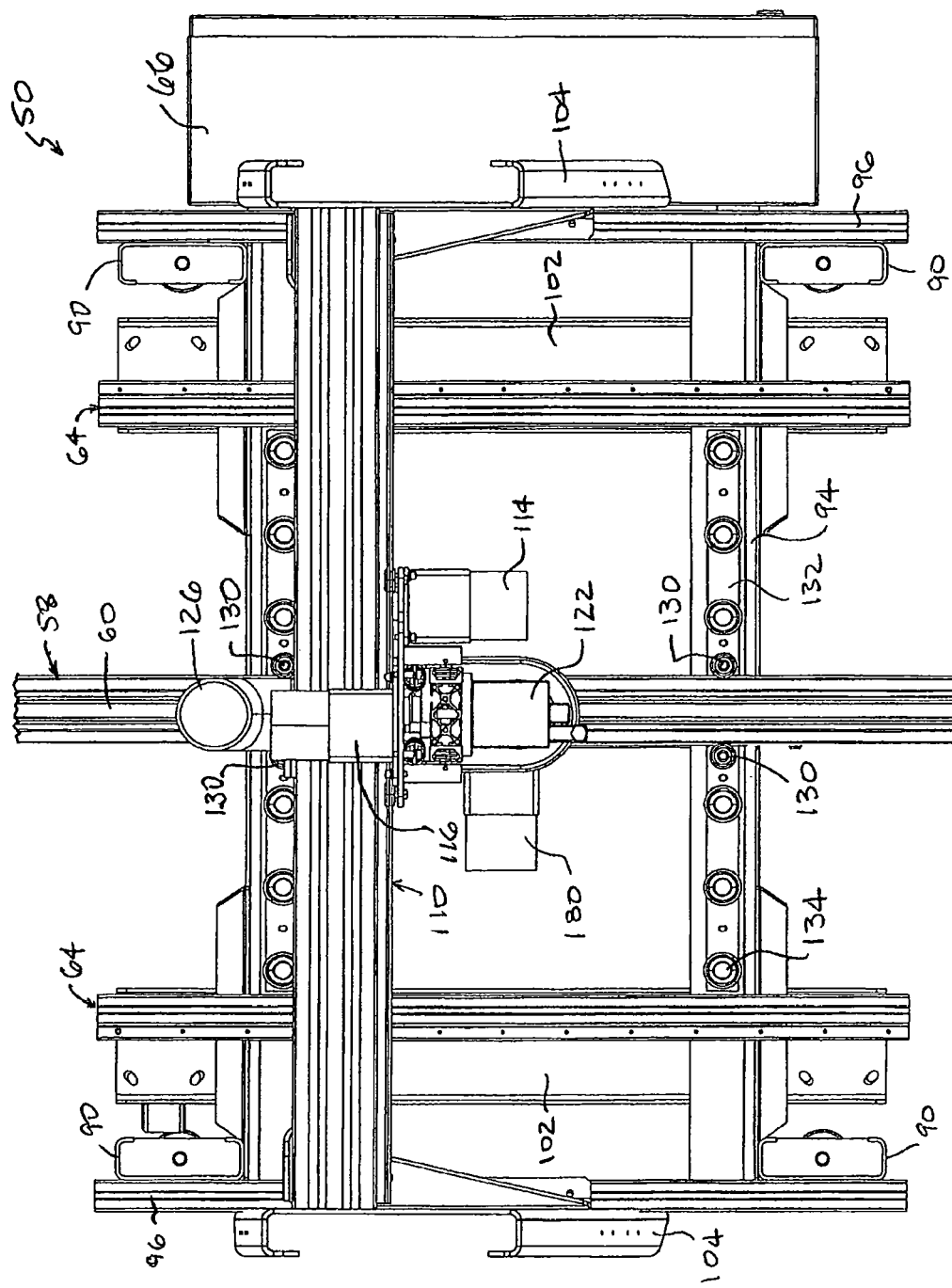
FIG. 10 is an enlarged top plan view of the CNC system of FIG. 1 with the work support surface removed.
Figure 11:
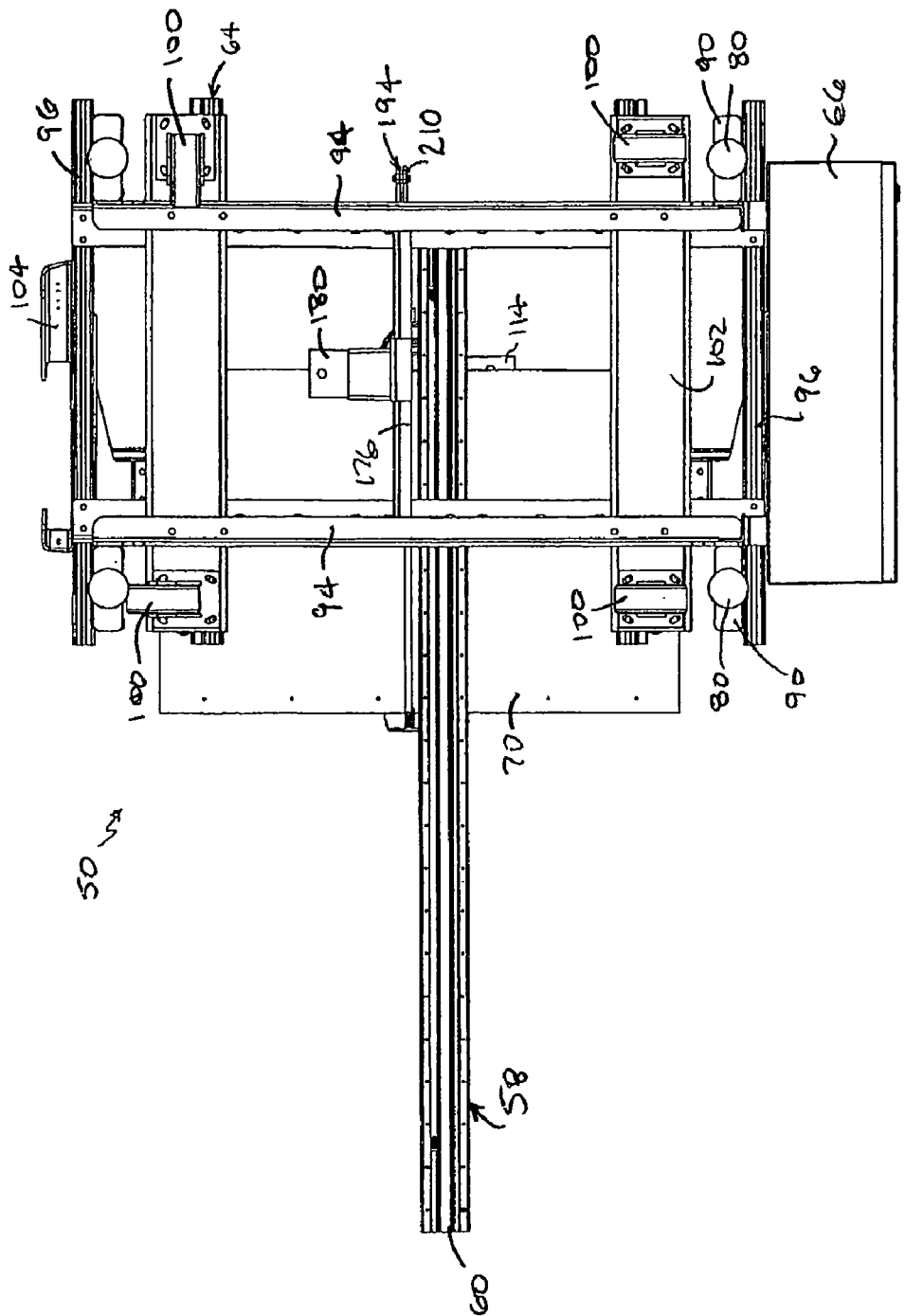
FIG. 11 is a bottom plan view of the CNC system of FIG. 1.
Figure 12:
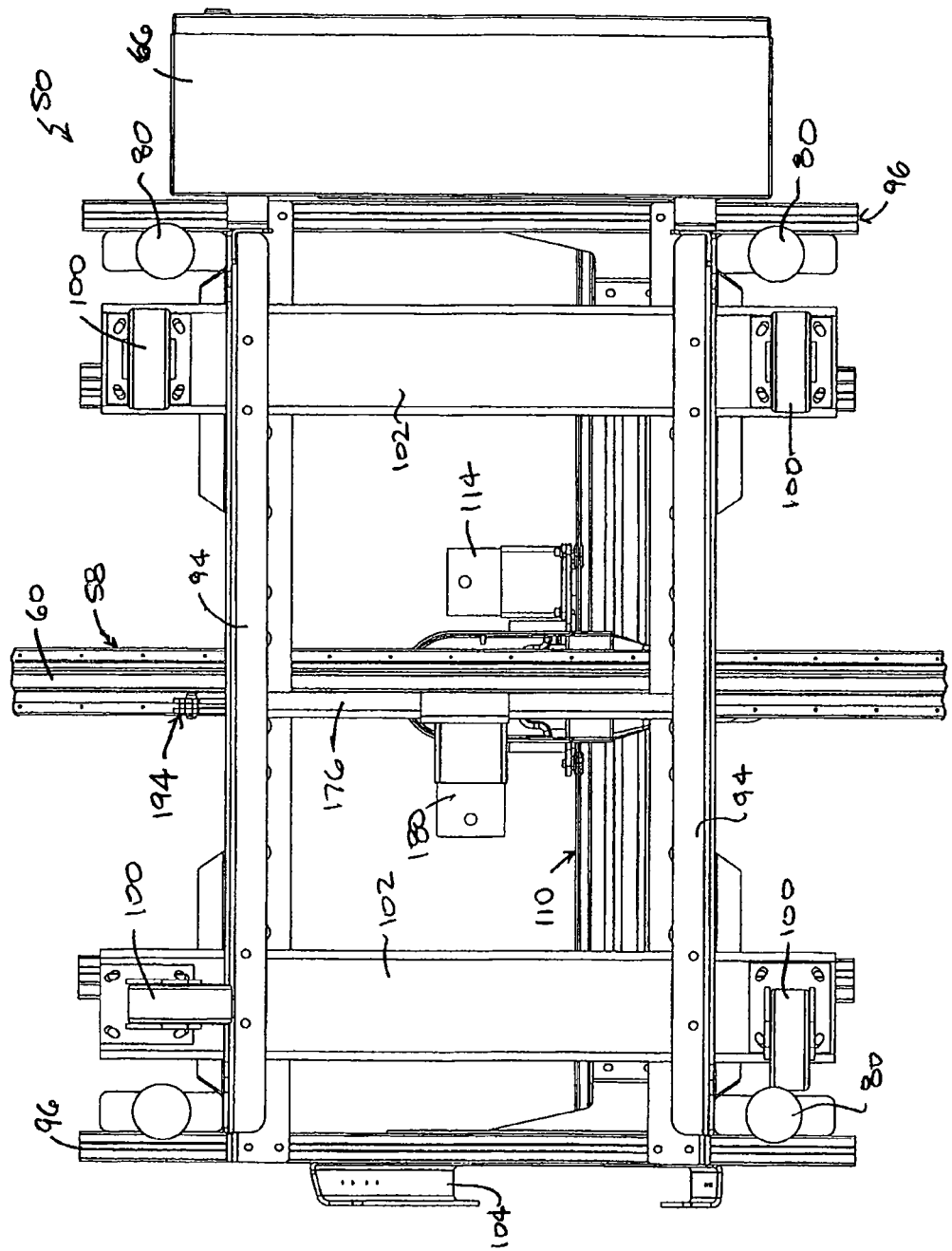
FIG. 12 is an enlarged bottom plan view of the CNC system of FIG. 1 with the work support surface removed.

As shown in FIG. 2 with the support surface 70 removed, and in greater detail in FIGS. 3-5, the drive bar assembly 58 includes an elongated drive bar 60, an embodiment of a travelling component, that may be supported by and be in rolling contact with four V bearings or guide wheels 130. The wheels 130 may provide for precise alignment and linear control of the drive bar. The guide wheels 130 may be mounted to guide bars 132 that are in turn mounted to the upper supports 94 of the base assembly 52. Ball rollers 134 may also be mounted to the guide bars 132, and are vertically aligned to contact and support the support surface 70, waste board, workpiece, or other material on either side of the drive bar 58 and allow for free motion of the support surface 70 and prevent the tooling in the cutting/drilling head from pushing the material down during plunging motion. Alternatively, the guide wheels 130, ball rollers 134, or both may be mounted directly to the upper supports 94 of the base assembly 52. The guide bars 132 are a separate component from the upper supports 94, but are integral with the upper supports 94, and the upper supports 94 themselves may have the guide wheels 130 and ball rollers 134 mounted directly to them, making the upper supports 94 serve as the guide bars 132. Other means, such as wheels, may be provided instead of ball rollers 134.

Of the four guide wheels 130, two guide wheels may be mounted concentrically on their shafts on one side of the drive bar 60 and the other two guide wheels may be mounted eccentrically on their shafts on the other side of the drive bar 60. Eccentric attachment relates to tension and allows for adjustment of the preload on the guide wheels 130.

The drive bar 60 may be in one embodiment an elongated aluminum drive bar extrusion 136 (for example, 1-inch high by 2-inches wide, or 1½ inches high by 3-inches wide) with drive bar rail assemblies 140 attached to it, as well as a gear rack 142. The extrusion 136 may generally be, for example, an elongated member substantially rectangular in cross-section, or may be other shapes, and may be other materials than aluminum. A central longitudinal axis may extend for the length of the extrusion 136. The material mounted to the top surface of the drive bar 60 may be bolted to the extrusion in t-slots 144 in the extrusion, and could have a fence, for example, at the back. The drive bar rail assemblies 140, mounted with t-bolts 148 on each 1-inch side of the extrusion, may be an aluminum bar 150 or track mount (½ inch by 1 inch) that is drilled and tapped to accept a hardened steel V guide or track 154 and counterbored for attachment hardware 156 used for connection to the main extrusion 136. Also attached to the drive bar rail assemblies 140 only on one side 158 (FIG. 5) are studs for hard limit stops and targets for proximity switches, not shown, that are used for soft limit stops and for homing of the drive bar 60. A piece of gear rack 142 is attached to the drive bar extrusion 136 using very high bond tape 172 and a machine screw 174 at each end to prevent detachment during shipping or from excessive torque on the rack 142 and drive bar 58. Teeth 175 are on the bottom surface of the rack 142. A slot 177 (FIG. 4) in the guide bar 132 allows the rack 142 to pass across the guide bar 132.

Figure 13:
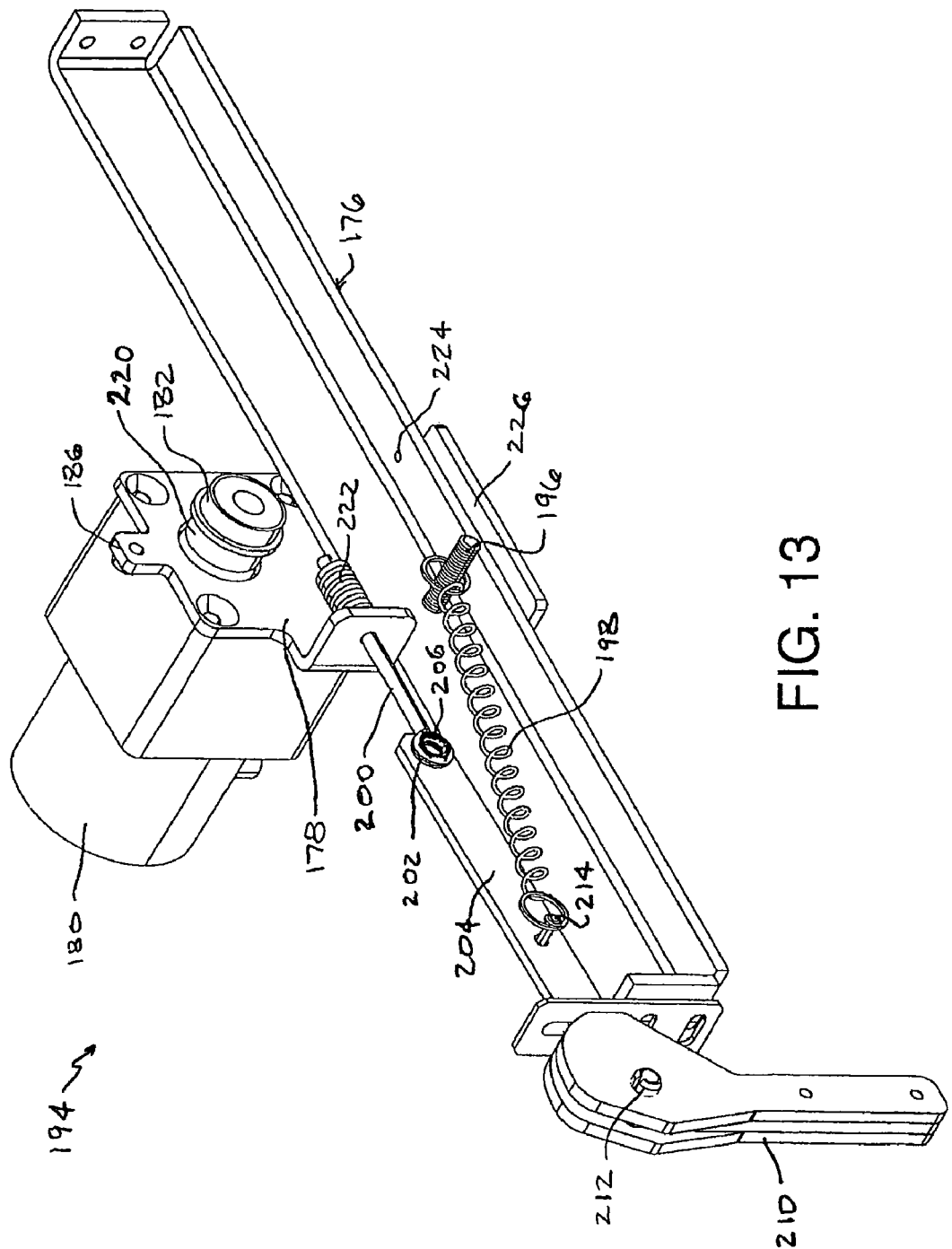
FIG. 13 is a downward perspective view of a cam release assembly of the CNC system of FIG. 1.

Returning to FIGS. 2 and 6-12 (control box 66 not shown in FIG. 6), an X motor support bracket 176 (FIG. 7) is mounted to the upper supports 94 of the base assembly 52 at each end, to which an X motor plate 178 is mounted. An X motor 180 controls the movement and position of the drive bar 60 along the x-axis, and in turn, the support surface 70, if any, and workpiece. As shown in FIG. 13, a pinion 182 driven by the X motor 180 engages the rack 142 on the drive bar 58 to control, position, and move the drive bar 60 in a line of travel substantially parallel to the x-axis. The X motor 180 is mounted to the X motor plate 178 and is horizontally oriented. In addition to supporting the X motor 180, the motor plate 178 provides a tab 186 for the stop studs on the drive bar to run into and a tapped hold for supporting the x-axis proximity switch (not shown). Alternatively, other types of drive systems may be used, for example, belt drives and screw drives, which would eliminate the rack 142 and pinion 182.

A cam assembly 194 may be provided to release the X motor 180 from the drive bar 60. Because of attachment to the cam assembly 194, the X motor plate 178 can be swung down out of the way, which may allow the drive bar 60 to be quickly and easily removed and another to be put in place with little effort or time. The X motor 180 has a pivot bolt 196 that goes through the motor plate 178 and the support bracket 176. This pivot bolt 196 may also provide a convenient location for attaching one end of a motor release spring 198. The pivoting motion required for the release of the X motor 180 from the drive bar 60 is controlled by a series of springs and a cam mechanism. The X motor 180, X motor plate 178, X motor support bracket 176, and cam release assembly 194, along with the drive bar assembly 58, may be considered to be drive bar apparatus.

The cam assembly 194 may include an eye bolt 200 that attaches to the X motor plate 178. A plastic bushing (not shown) is inserted into the eye 202 of the bolt 200 to allow it to pivot freely at the end of a link arm 204. A hex head screw 206 is used to attach the eye to the link arm 204 and a flat washer (not shown) is used to prevent the screw 206 from slipping off the bushing. A cam handle 210 may be attached at the other end of the link arm 204, which passes through a slot in the front upper support 94. The remaining end of the release spring 198 may be attached to a hexhead screw 214 on the link arm 204. The cam handle 210 may be attached to the link arm 204 with a split spring pin 212 and in the tensioned and locked position holds the X motor plate 178 in a position that engages the pinion gear 182 on the X motor shaft 220 into the gear rack 142 on the drive bar 60. Tension on the pinion 182 is maintained by a die spring 222 that is attached to the end of the eye bolt 200. This spring 222 may be compressed when the cam handle 210 is in tension to prevent the pinion 182 from disengaging the gear rack 142 when being moved. Also, to prevent the die spring 222 from putting too much force on the pinion 182, motor shaft 220 or gear rack 142 an adjusting screw (not shown) is provided in the bottom of the support bracket 176. This adjusting screw is inserted into a tapped hole 224 in the bottom of the support bracket 176 and pushes on the lower flange 226 of the motor plate 178. When in the opened or un-tensioned position the adjusting screw allows the motor plate 178 to pivot, disengaging the pinion 182 on the motor shaft 220 and allowing the drive bar 60 to move freely within the V wheels 130.

Figure 14:
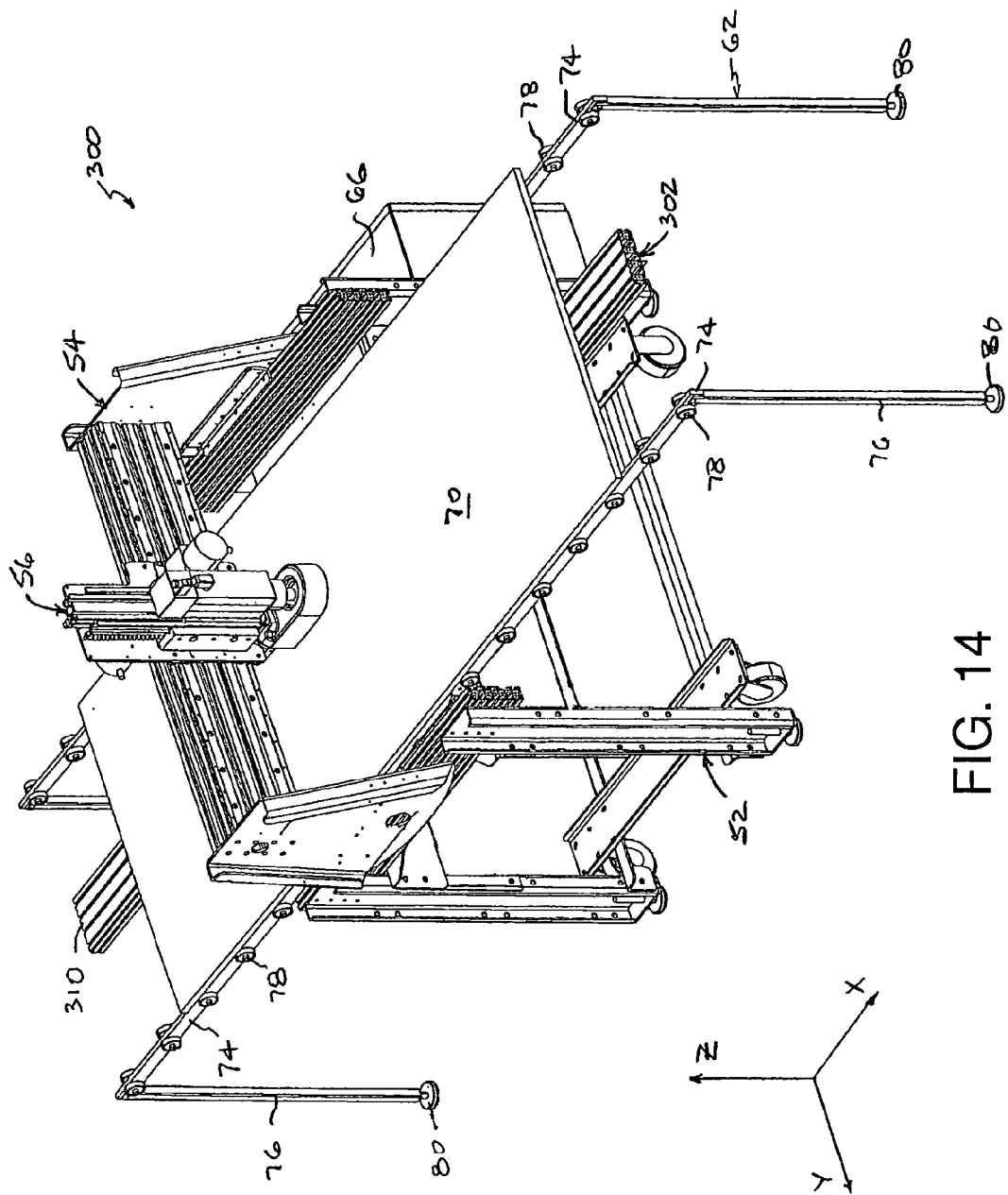
FIG. 14 is a downward perspective view of another embodiment of a CNC system according to the present invention.
Figure 15:
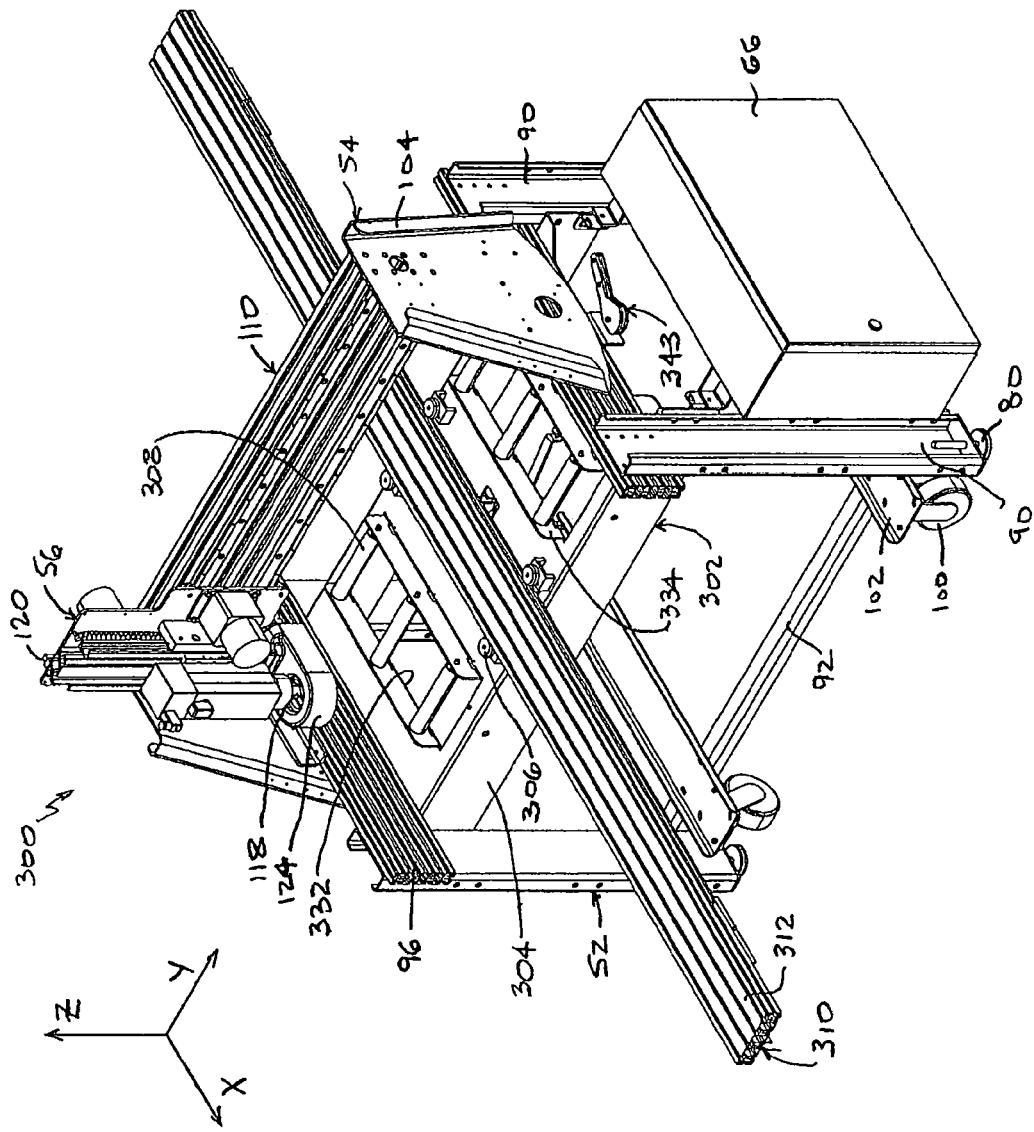
FIG. 15 is a downward perspective view of the CNC system of FIG. 14 with the work surface removed.
Figure 16:
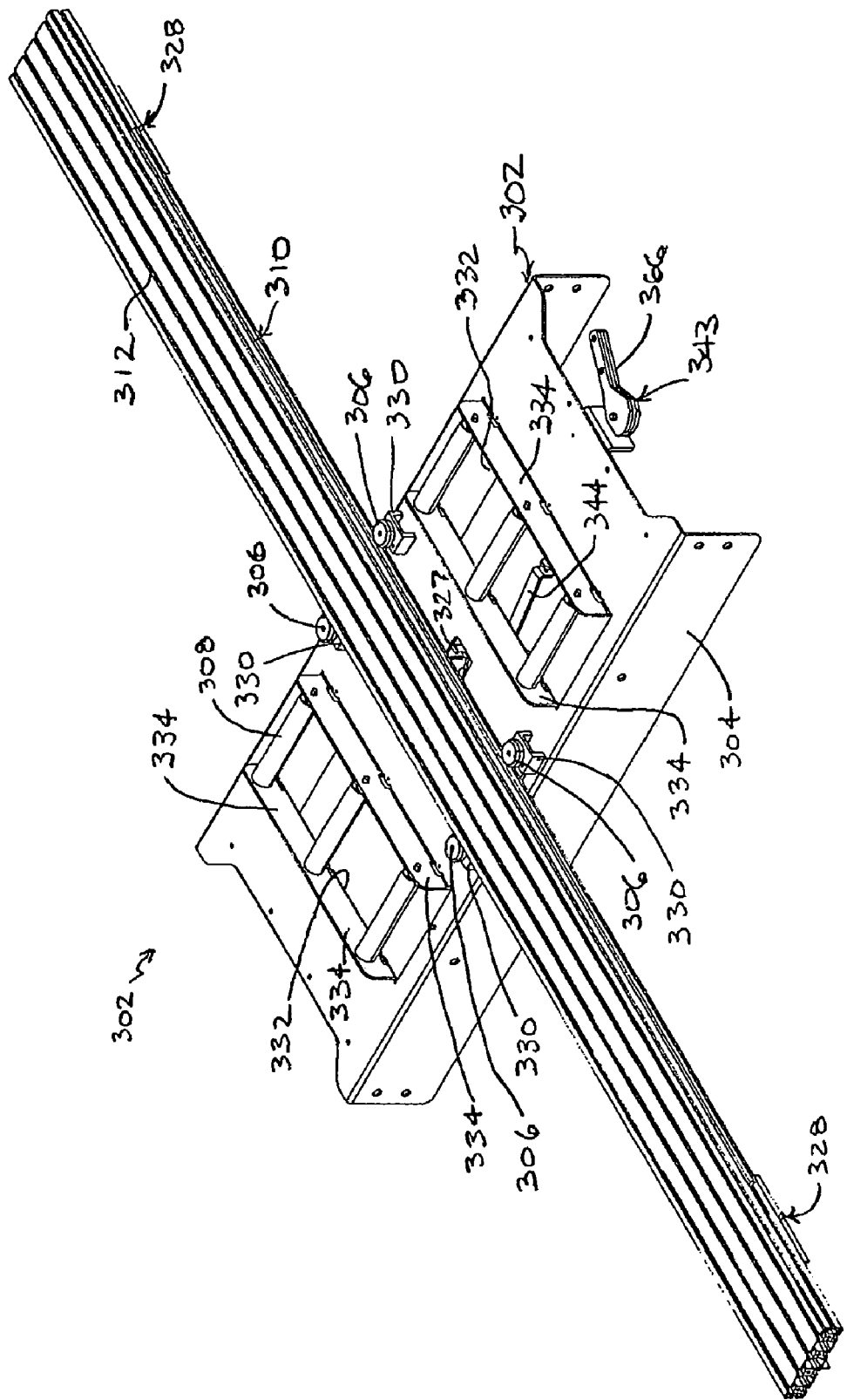
FIG. 16 is a perspective view of a drive bar assembly of the CNC system of FIG. 14.
Figure 17:
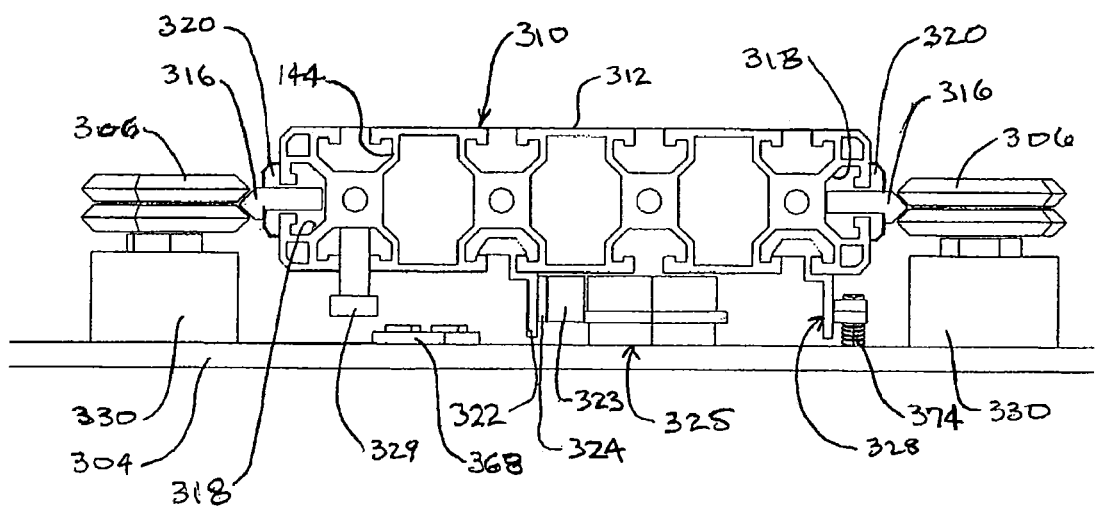
FIG. 17 is front elevation view of the drive bar assembly of the CNC system of FIG. 14.

FIGS. 14-25 show another embodiment of a CNC system 300 according to the present invention. As shown in FIG. 14, this system 300 may have a gantry assembly 54, control box 66 configuration, legs 90, lower supports 92, sides 96, casters 100, caster supports 102, outfeed assembly 62, and machine glides 80 that are identical to those of the previous embodiment 50 of FIGS. 1-3. A support surface 70 may likewise be provided. A drive bar assembly 302 is provided, and FIG. 15 shows the exposed drive bar assembly 302, detailed further in FIGS. 16-18.

A deck 304, generally formed of a plate with downward facing flanges along front and rear ends, is mounted to each leg 90 near the upper end of the legs, just below where the sides 96 connect to the legs 90. Above its top surface, the deck 304 supports four V guide wheels 306 and two rows of three conveyor rollers 308. The V guide wheels 306 support a drive bar 310. The drive bar 310, V guide wheels 306, conveyor rollers 308, deck 304, and appurtenant parts may make up the drive bar assembly 302.

The drive bar 310, an embodiment of a travelling component, may include an elongated member 312 substantially rectangular in cross-section that in one embodiment may be a 40mm high by 160mm wide aluminum extrusion, with a hardened V guide or track 316 in an opening 318 on each vertical side of the drive bar extrusion 312. Other shapes may and materials also be used. The track 316 may be mounted to the extrusion 312 with hardware such as machine screws or bolts, or press fit in the opening 318 with a track holder extrusion 320. Again, other variations of track shapes may be selected, including round rail track. A central longitudinal axis may extend for the length of the extrusion 312. A rack extrusion 322 is attached to the bottom of the drive bar extrusion 312 to hold a gear rack 323. The gear rack 323 is attached to the rack extrusion 322 using very high bond tape 324 and a machine screw (not visible) at each end. A pinion 325 (FIG. 17) driven by a vertically oriented X motor 326 under the deck 304 extends through an opening 327 on the deck 304 to engage the gear rack 323. Also attached to the bottom of the drive bar 310 are hard stop studs 328 that may be made up an extrusion and a protrusion, and proximity switch targets 329. Alternatively, as with the previously discussed embodiment 50, other types of drive systems may be used, for example, belt drives and screw drives, which would eliminate the rack 323 and pinion 325.

Of the four V guide wheels 306, the drive bar 310 is supported by two V wheels on mounted concentrically to their shafts on one side of the drive bar 310 and two V wheels mounted eccentrically to their shafts on the opposite side of the drive bar 310 to allow for adjustment of the tension of the wheels 306 on the drive bar 310. The wheels 306 may be supported by spacer blocks 330 that raise the drive bar 310 off of the deck 304 far enough to allow sufficient clearance for the drive bar rack 323 to clear the deck 304.

The deck 304 has two generally rectangular openings 332 with upward facing vertical flanges 334 on each side of the openings 332 that are parallel to the x-axis. Three conveyor rollers 308 in each opening 332 are supported at each end by the flanges 334, oriented parallel to the alignment of each pair of guide wheels 306 that accept the drive bar 310. Other configurations, such as spacers, may support the conveyor rollers 308. Along with the drive bar 310, the conveyor rollers 308 are used to support the work support surface 70 or workpiece. Appropriate setting of the height of the rollers 308 is needed for the proper operation of the drive bar 310 and a consistent work height during operations. If necessary, the roller height may be adjusted by a hex head screw (not shown) under each end of each roller 308. These "jack screws" may be tapped into the deck 304 in a vertical orientation and use a jamb nut to lock them into place after adjustment is completed.

Figure 18:
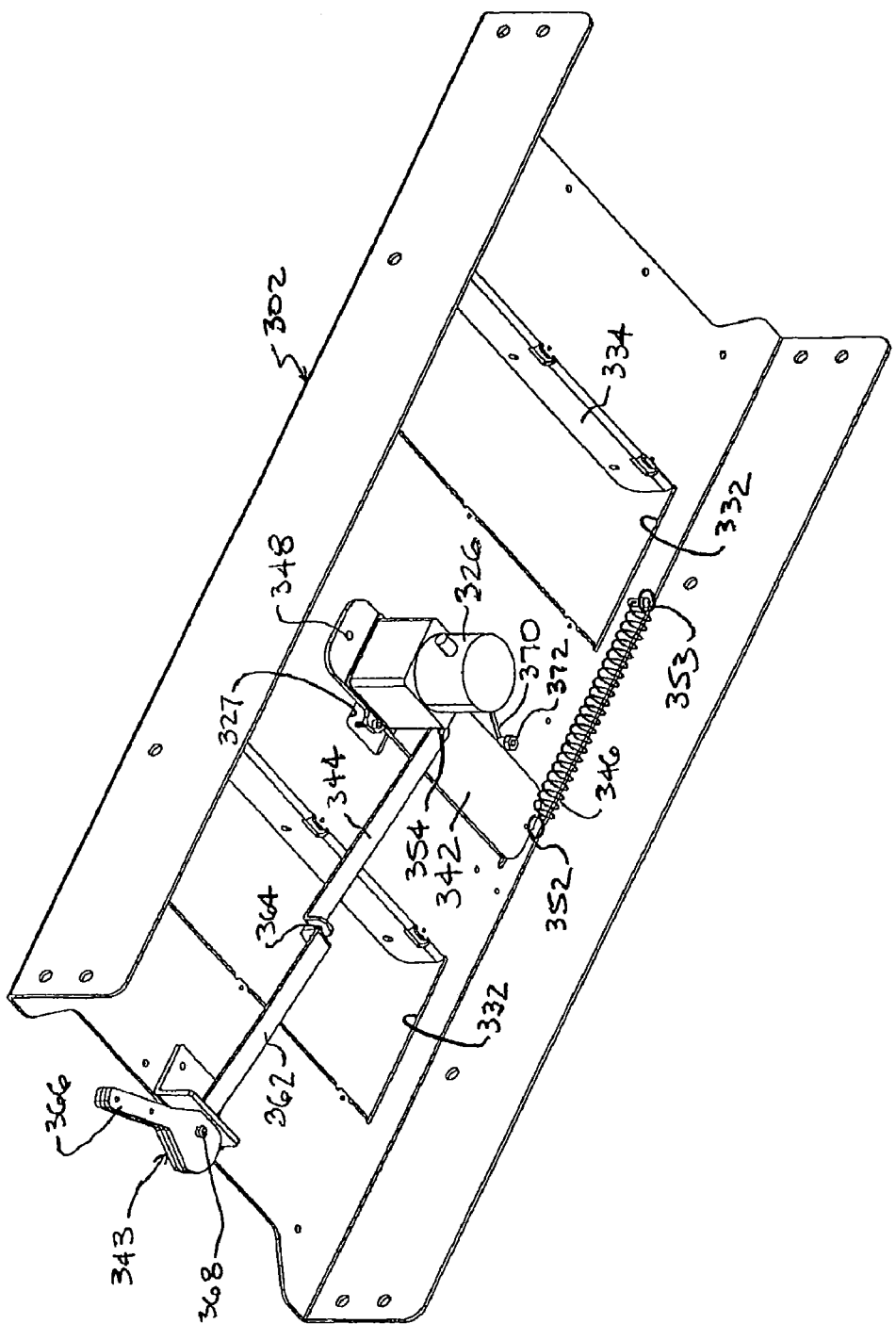
FIG. 18 is front elevation view of the CNC system of FIG. 14.
Figure 19:
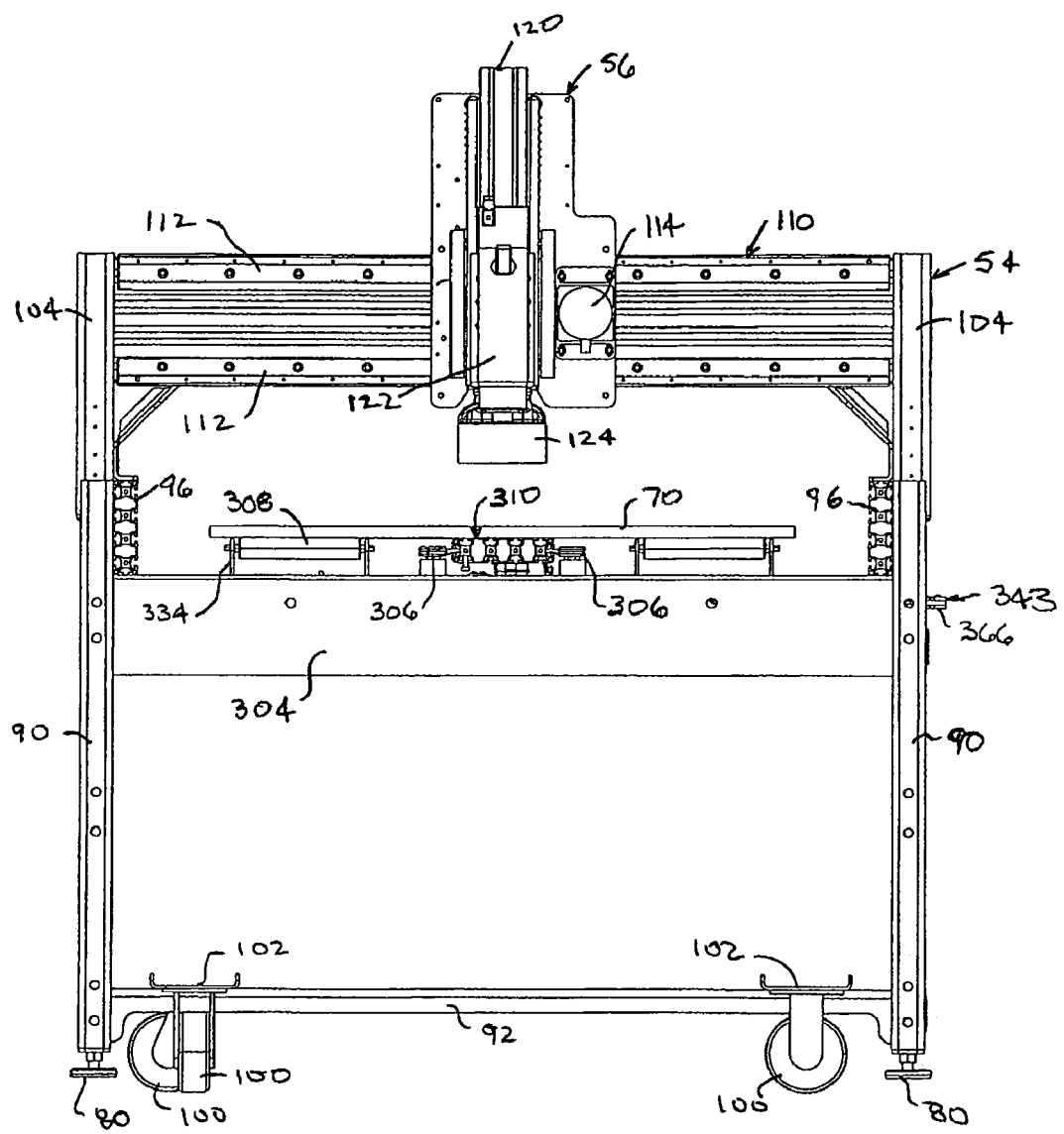
FIG. 19 is a right side elevation view of the CNC system of FIG. 14.
Figure 20:
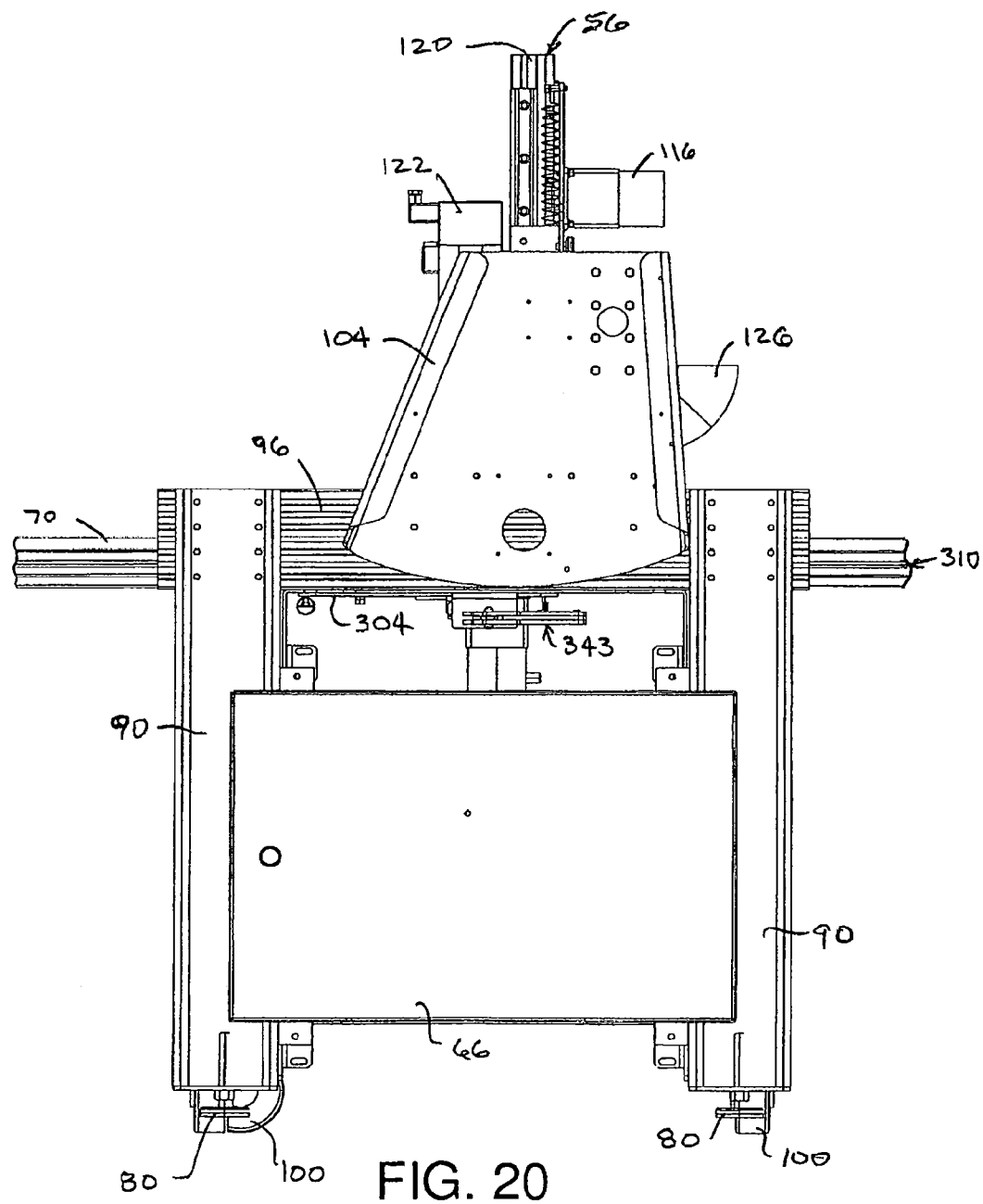
FIG. 20 is an upward perspective view of the CNC system of FIG. 14 with the work support surface removed.
Figure 21:
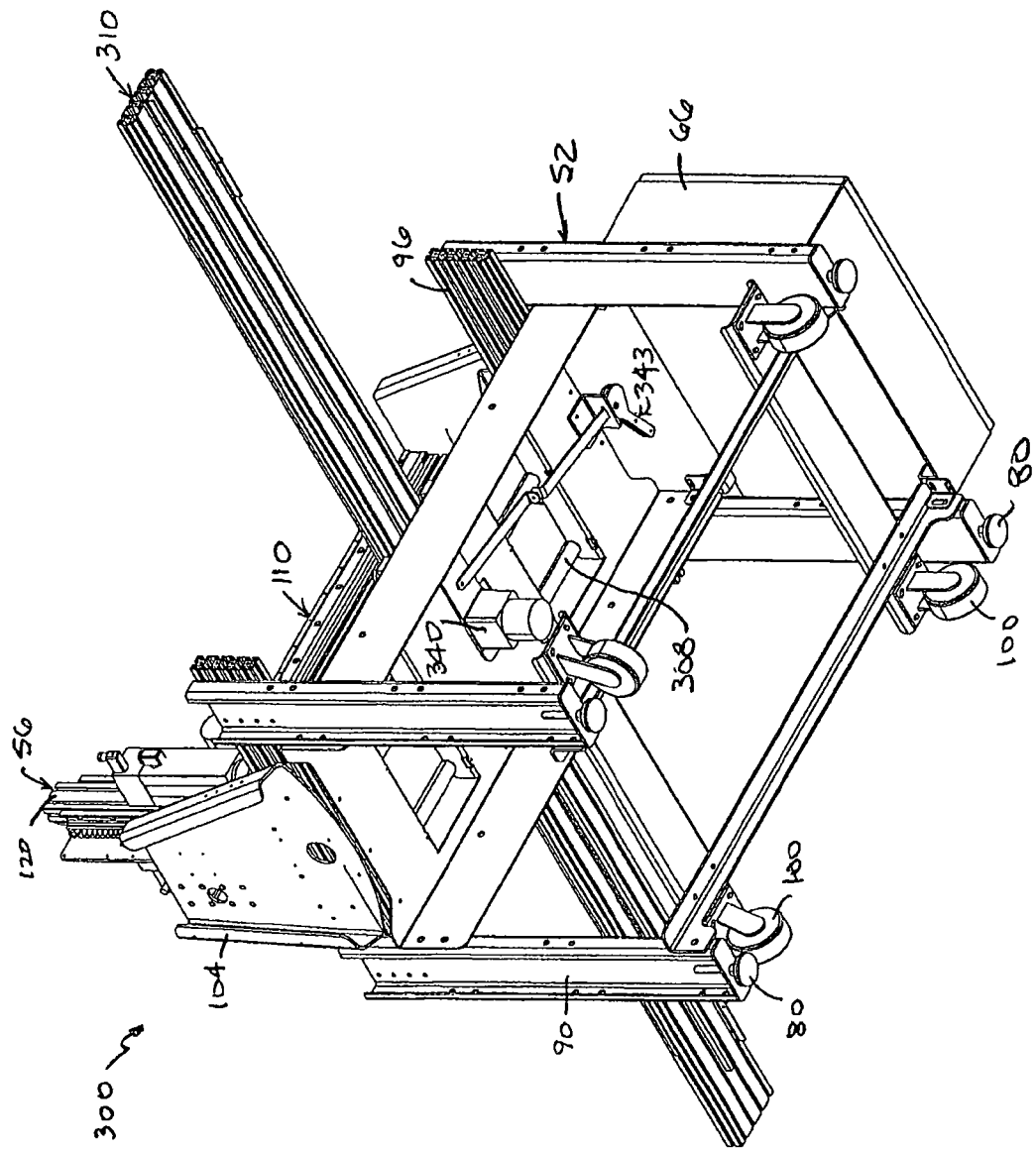
FIG. 21 is a top plan view of the CNC system of FIG. 14 with the work support surface removed.
Figure 22:
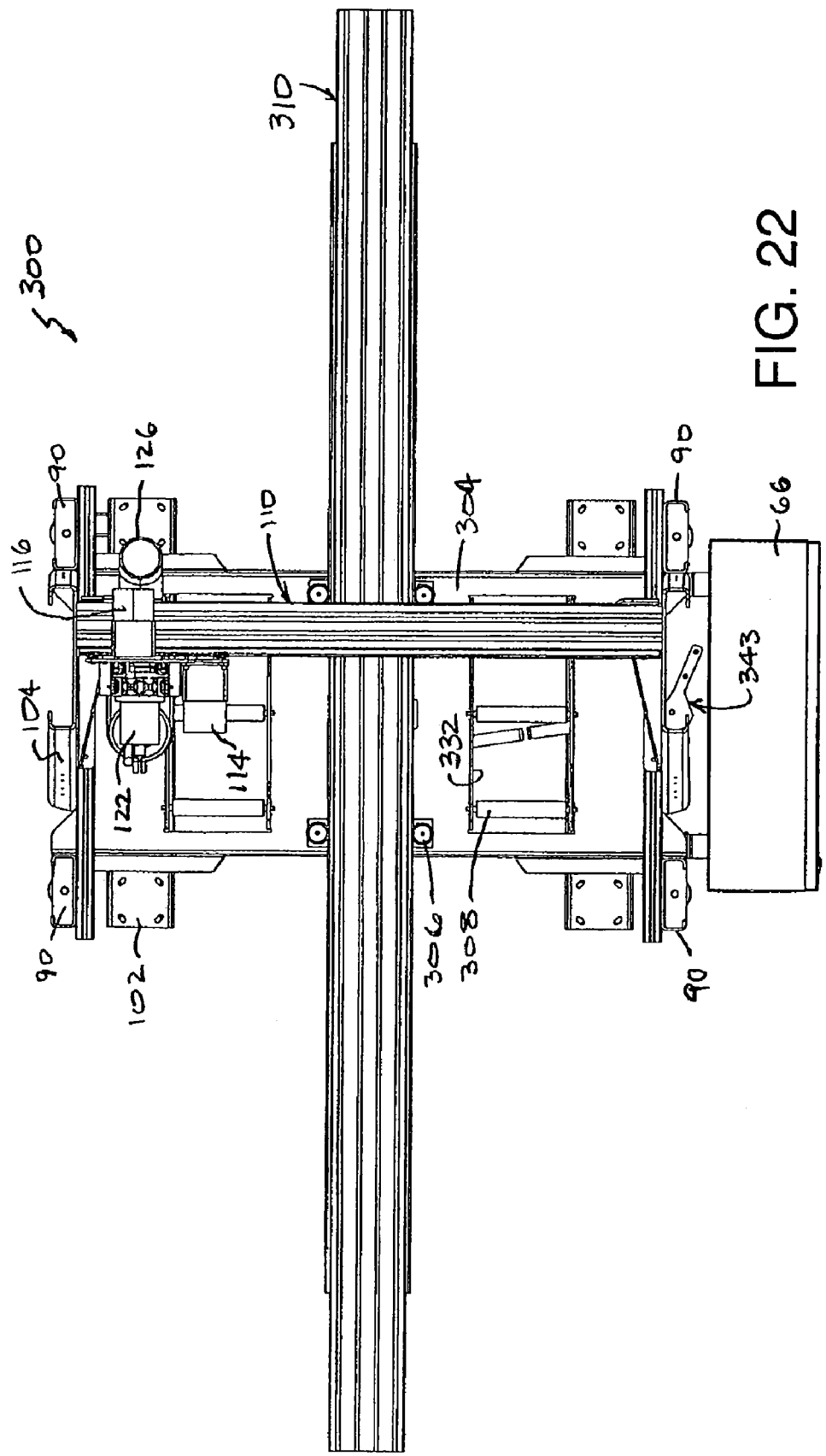
FIG. 22 is an enlarged top plan view of the CNC system of FIG. 14 with the work support surface removed.
Figure 23:
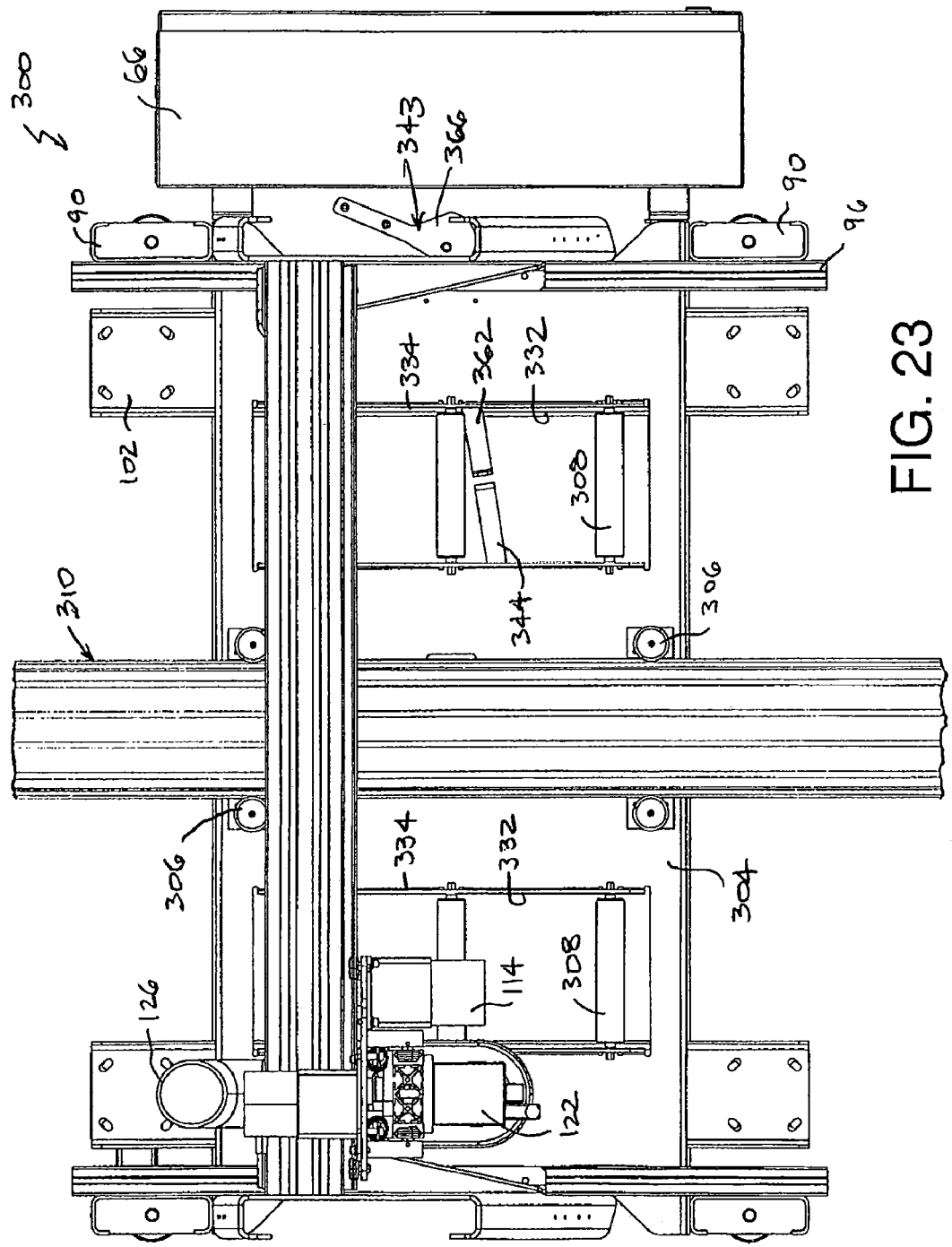
FIG. 23 is a bottom plan view of the CNC system of FIG. 14 with the work support surface removed.
Figure 24:
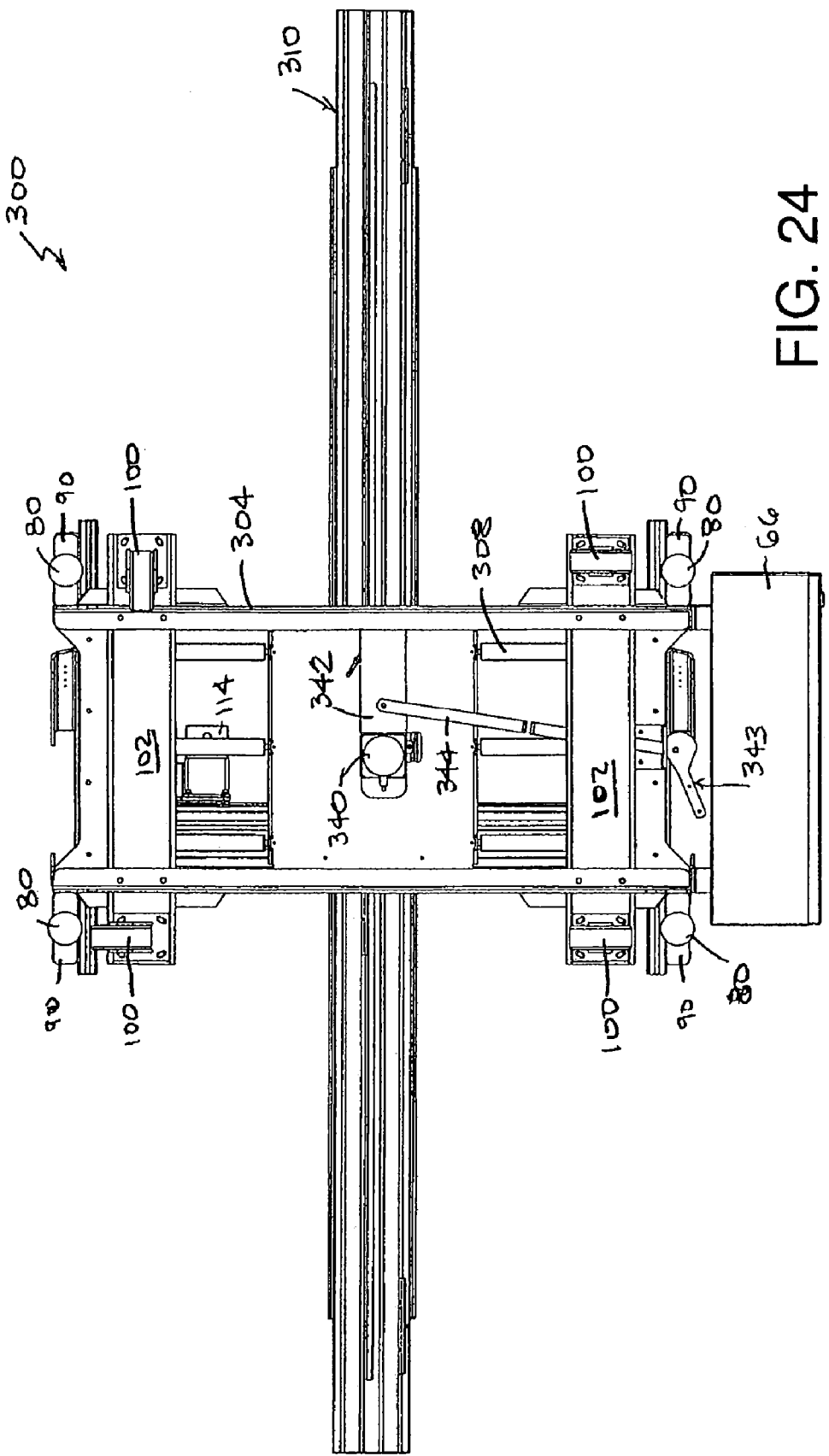
FIG. 24 is an enlarged bottom plan view of the CNC system of FIG. 14 with the work support surface removed.
Figure 25:
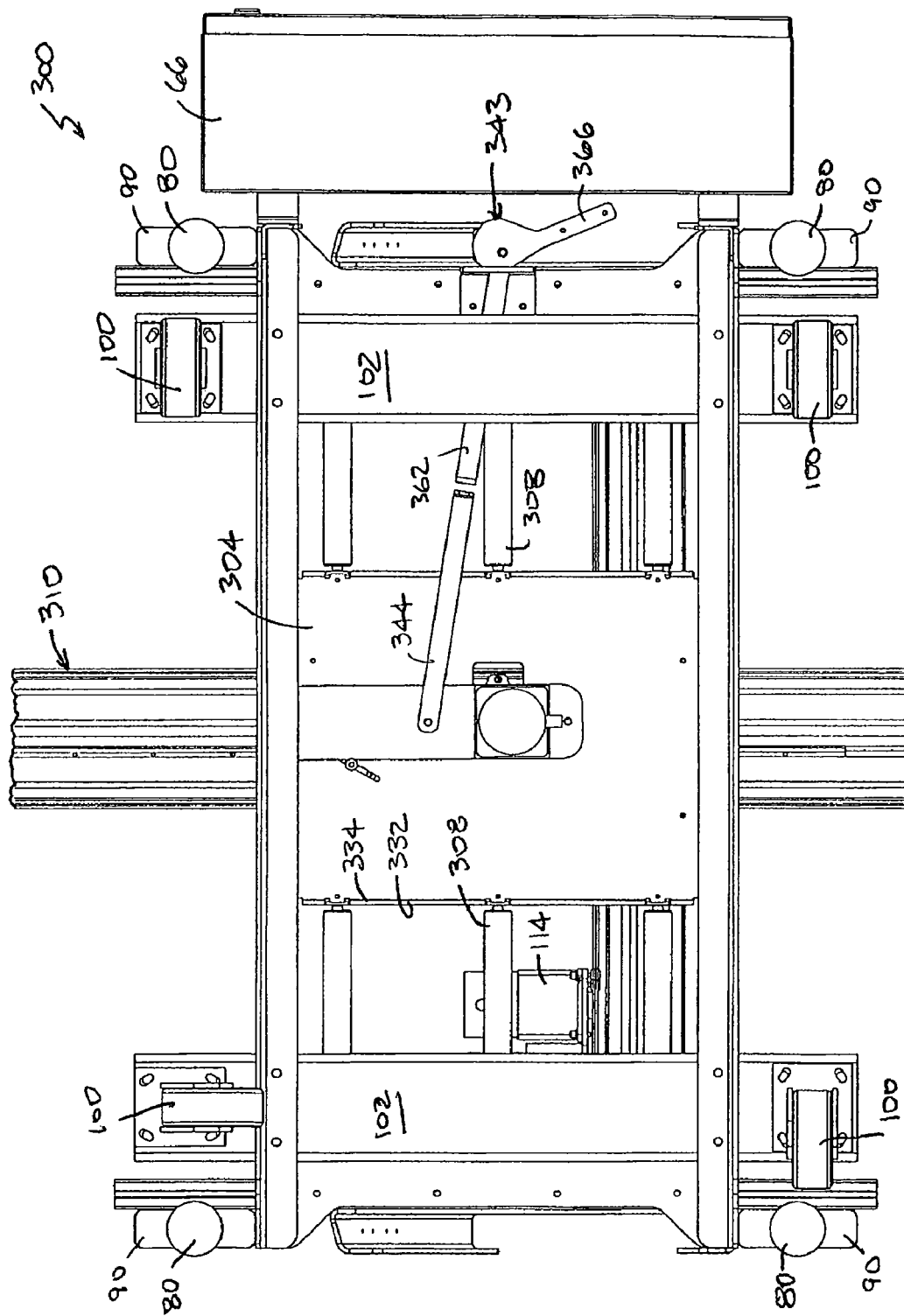
FIG. 25 is an upward perspective view of a cam release assembly of the CNC system of FIG. 14.

As shown in FIG. 18, the vertically oriented X motor 326 may be attached to an X motor plate 342 that may be mounted in a horizontal orientation. The motor plate 342 may have attached to it a cam assembly 343, including a cam link arm 344 and tension spring 346 for maintaining pinion engagement. One end of the motor plate 342 may be held to the bottom of the deck 304 with a pivot bolt 348, and the other end may be supported in a radial slot 350 by a hex screw 352. This hex screw 352 has a plastic washer between the head and the deck 304 and is inserted from the top of the deck 304 into the motor plate 342. The end of the pivot bolt 348 is locked to the motor plate 342 using a jamb nut, allowing the tension on the plastic washer to be adjustable and a making it possible to control that amount of drag on the pivot. To the end of the hex screw 352 the tension spring 346 is attached and another nut is used to prevent it from slipping off the end of the screw shaft. The other end of the tension spring 346 is attached to the deck 304 using a hex screw 353, jamb nut, and nut to hold it in place. This spring 346 biases the pinion 325 into the gear rack 323 on the drive bar 310. To release the pinion 325 from the gear rack 323, the link arm 344 may be attached to the motor plate 342 with a bolt and nut 354. This link arm 344 may be attached to another link arm 362 using a hex screw 364. The other end of the second link arm 362 may be attached to a cam handle 366 and attached using a split spring pin 368, as in the embodiment of FIGS. 1-13.

When the cam handle 366 is in the closed position, it allows the tension spring 346 to pull the pinion 325 into the gear rack 323, stopped by an adjustable stop 368. The adjustable stop 368 may be a double t-nut that is held in a slot 370 in the deck 304. This slot allows the position of the stop to be changed when different pinion diameters are used. In the t-nut 368 is a hex screw 372 and an eccentric bushing used to finely adjust the pinion pressure on the gear rack 323. In the opened position the cam handle 366 pulls the motor plate 342, extending the tension spring 346, and disengaging the pinion 325 from the gear rack 323. In addition to the X motor 326 pivoting to disengage the pinion, the motor 326 also pivots a stop stud 374 out of the path of the stop studs 328 at each end of the drive bar 310, facilitating removal of the drive bar 310.

While the outfeed assembly 62 may be identical to the outfeed assembly 62 of FIG. 1, the attachment to the system 300 may differ. In the embodiment of FIGS. 14-25, holes may be provided in the vertical flanges 334 that support the conveyor rollers 308. Hex screws may be inserted through the holes in the flanges 334 and tap into the outfeed bars 74. Thus, there are two more attachments points for the outfeed assembly 62 in the embodiment of FIGS. 14-25 than in the previously discussed embodiment 50, making support for narrower work support surfaces possible.

In certain embodiments according to the present invention, the rails or tracks may be single edge track as manufactured by Bishop-Wisecarver Corporation of Pittsburg, Calif. Ball rollers as shown and as manufactured, for example, by Hudson Bearings, Inc. of East Lyme, Conn., Model SBT-1CS, or may be wheel rollers. Conveyor rollers may be as made by Ashland Conveyor Products of Ashland, Ohio, Conveyor Roller, Model CFG08. V guide wheels may be, for example, Integral Stud DualVee® guide wheels by Bishop-Wisecarver Corporation, model SWIC2 or SWIE2. The racks may be as made by, for example, EPT Browning of Maysville, Ky., Model YSR-20×5, and length as needed. The motors for the system may be, for example, digital "stepper" motors, with a homing system and high accuracy, or servo motors.

The CNC system according to the present invention may provide the ability to address registration, tracking, and positioning of relatively long stock in a relatively small tool for three dimensional machining processes related to woodworking, plastics and soft metals. The drive bar may be any practical length to accommodate desired lengths of workpieces. For example, the length of a drive bar may be two to four times the length of the base of the CNC system or more. Short or long lengths of material may be handled in some embodiments, and the length of material may be limited by what a motor can push or pull and the load carrying capacity of the support system. The removable drive bar and support surface, workpiece, or other material, because the drive bar may be removed with relative ease, may allow use of relatively little storage space as compared to a conventional system.

Specific embodiments of an invention are described herein. One of ordinary skill in the CNC machine arts will recognize that the invention has other applications in other environments.

In fact, many embodiments and implementations are possible. For example, the CNC machine and drive bar of the present invention may be made in different shapes and sizes, and used with and made of a variety of materials and components. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

What is claimed is:

1. An assembly for supporting a support surface, workpiece, or other material in a computer numerically controlled material processing system, the support assembly comprising:
   an elongated travelling component, including:
      an elongated structural member, adapted to have supported material mounted thereto and having a central longitudinal axis;
      two tracks mounted longitudinally to the elongated member on opposite sides of the elongated member; and
      an elongated rack including teeth, the rack adapted to accept a pinion and mounted longitudinally to the elongated member;
   two spaced, parallel, elongated structural guide members perpendicular to the elongated structural member; and
   two pairs of guide wheels, each guide wheel with a shaft mounted to one side of each guide member such that the shaft of each guide wheel is substantially perpendicular to the guide member surface to which each respective guide wheel is mounted,
   wherein each pair of guide wheels is spaced to be in rolling contact with the tracks as the elongated travelling component moves between the guide wheels.

2. The support assembly of claim 1, wherein the elongated member comprises an extrusion.

3. The support assembly of claim 2, wherein the extrusion has a substantially rectangular cross-section.

4. The support assembly of claim 1, wherein the elongated member includes longitudinal openings that may be used for mounting the supported material to the elongated member.

5. The support assembly of claim 1, wherein the tracks are V tracks.

6. The support assembly of claim 1, wherein the tracks are round tracks.

7. The support assembly of claim 1, further comprising two spaced pairs of guide wheels adapted to be in rolling contact with the tracks, and a shaft for each guide wheel.

8. The support assembly of claim 7, wherein one guide wheel of each pair of guide wheels is concentrically mounted to a first shaft, and the other guide wheel of each pair of guide wheels is eccentrically mounted to a second shaft.

9. The support assembly of claim 7, wherein the guide wheels are V guide wheels, including a V shaped recess to accept V tracks.

10. The support assembly of claim 7, wherein the guide wheels include a substantially semicircular recess to accept round tracks.

11. The support assembly of claim 7, further comprising a structural deck including a substantially planar portion to which the guide wheel pairs are mounted, wherein each pair of guide wheels is spaced to be in rolling contact with the tracks.

12. The support assembly of claim 11, further comprising ball rollers mounted to the deck on the same side of the substantially planar portion as the guide wheels.

13. The support assembly of claim 11, further comprising rollers mounted to the deck on the same side of the substantially planar portion as the guide wheels.

14. The support assembly of claim 11, further comprising conveyor rollers mounted to the deck on the same side of the deck as the guide wheels, wherein the conveyor rollers are substantially parallel to the alignment of each pair of guide wheels.

15. The support assembly of claim 1, further comprising ball rollers mounted to the guide members on the same side of the guide members as the guide wheels.

16. The support assembly of claim 1, further comprising rollers mounted to the guide members on the same side of the guide members as the guide wheels.

17. A computer numerically controlled material processing system, comprising:
a base assembly;
a stationary gantry assembly fixedly mounted to the base assembly and including a substantially horizontal gantry aligned substantially parallel to a y-axis;
a carriage assembly mounted to the gantry for traveling along the gantry, the carriage assembly including means for vertical tool travel substantially parallel to a vertical z-axis;
an elongated travelling component oriented along a line of travel substantially parallel to an x-axis, perpendicular to the y- and z-axes, including:
an elongated member, adapted to have supported material mounted thereto and having a central longitudinal axis substantially parallel to the x-axis; two tracks mounted longitudinally to the elongated member on opposite sides of the elongated member; and
a rack, adapted to accept a pinion, mounted longitudinally to the elongated member;
two pairs of guide wheels and respective shafts, each pair of guide wheels spaced to allow the travelling member to pass therethrough in rolling contact with the tracks;
a structural guide support element integral to the base assembly and to which the guide wheels are mounted, wherein the shaft of each guide wheel is substantially perpendicular to the guide support element surface to which each respective guide wheel is mounted; and
a pinion engaging the rack and driven by a motor to urge the travelling component to move along the line of travel.

18. The system of claim 17, wherein the base assembly has a width generally parallel to the y-axis and a length generally parallel to the x-axis, and the travelling component is at least twice as long as the length of the base assembly.

19. The system of claim 17, wherein the base assembly has a width generally parallel to the y-axis and a length generally parallel to the x-axis, and the travelling component is at least four times as long as the length of the base assembly.

20. The system of claim 17, wherein the elongated member comprises an extrusion.

21. The system of claim 20, wherein the extrusion has a substantially rectangular cross-section.

22. The system of claim 17, wherein the tracks are V tracks.

23. The system of claim 17, wherein the tracks are round tracks.

24. The system of claim 17, wherein one guide wheel of each pair of guide wheels is concentrically mounted to that guide wheel's shaft, the other guide wheel of each pair of guide wheels is eccentrically mounted to that guide wheel's shaft, and all of the guide wheels include recesses shaped to accept the shape of the tracks.

25. The system of claim 17, wherein the guide support element comprises two spaced, parallel, elongated structural guide members substantially perpendicular to the elongated member.

26. The system of claim 25, further comprising ball rollers mounted to the guide members on the same side of the guide members as the guide wheels.

27. The system of claim 25, further comprising rollers mounted to the guide members on the same side of the guide members as the guide wheels, and a shaft for each support wheel.

28. The system of claim 17, wherein the guide support element comprises a structural deck including a substantially planar portion to which the guide wheel pairs are mounted, wherein each pair of guide wheels is spaced to be in rolling contact with the tracks.

29. The system of claim 28, further comprising ball rollers mounted to the deck on the same side of the substantially planar portion as the guide wheels.

30. The support assembly of claim 28, further comprising rollers mounted to the deck on the same side of the substantially planar portion as the guide wheels.

31. The support assembly of claim 28, further comprising conveyor rollers mounted to the deck on the same side of the deck as the guide wheels, wherein the conveyor rollers are substantially parallel to the alignment of each pair of guide wheels.

32. The system of claim 17, wherein the pinion may be disengaged from the rack by pivoting the motor.

33. A method of making a travelling component for processing material with a computer numerically controlled system, the system including a base assembly, a stationary gantry assembly fixedly mounted to the base assembly and including a horizontal gantry, a carriage assembly mounted to the gantry for traveling along the gantry including a tool for operating on a workpiece, and means for vertical tool travel, the material to be processed supported by and travelling concurrently with the travelling component in a horizontal direction substantially perpendicular to the gantry, the method comprising:
providing an elongated structural member, adapted to have supported material mounted thereto and having a central longitudinal axis;
mounting two tracks longitudinally to the elongated member on opposite sides of the elongated member;
mounting an elongated rack including teeth, the rack adapted to accept a pinion, longitudinally to the elongated member;
providing two spaced, parallel, elongated structural guide members perpendicular to the elongated structural member;
mounting a pair of guide wheels to each structural guide member, each guide wheel with a shaft mounted to one side of each guide member such that the shaft of each guide wheel is substantially perpendicular to the guide member surface to which each respective guide wheel is mounted; and
aligning the guide wheels to receive the tracks, wherein the guide wheels are spaced to be in rolling contact with the tracks as the elongated structural member, tracks, and elongated rack move between the guide wheels.

34. A method of processing material with a computer numerically controlled system, the system including a base assembly, a stationary gantry assembly fixedly mounted to the base assembly and including a substantially horizontal gantry aligned substantially parallel to a y-axis, a carriage assembly for traveling along the gantry, the carriage assembly including means for vertical tool travel substantially parallel to a vertical z-axis, the method comprising:

moving an elongated travelling component oriented along a line of travel substantially parallel to an x-axis, perpendicular to the y- and z-axes, the travelling component including:

an elongated member, adapted to have supported material mounted thereto and having a central longitudinal axis substantially parallel to the x-axis;

two tracks mounted longitudinally to the elongated member on opposite sides of the elongated member; and an elongated rack including teeth, the rack adapted to accept a pinion and mounted longitudinally to the elongated member;

aligning the travelling component with two pairs of guide wheels and respective shafts, with one pairs of guide wheels mounted to each of two spaced, parallel, elongated structural guide members configured perpendicularly to the elongated travelling component, each pair of guide wheels spaced to allow the travelling member to pass therethrough in rolling contact with the tracks;

urging the travelling component to move along the line of direction by driving a pinion with a motor while the pinion engages the rack.

\* \* \* \* \*